(12) United States Patent
Owusu et al.

(10) Patent No.: US 6,531,212 B2
(45) Date of Patent: Mar. 11, 2003

(54) RETROREFLECTIVE ARTICLE AND METHOD

(75) Inventors: Osei A. Owusu, Woodbury, MN (US); Brandt K. Carter, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/783,361

(22) Filed: Feb. 14, 2001

(65) Prior Publication Data

US 2002/0155276 A1 Oct. 24, 2002

(51) Int. Cl.$^7$ ................................................. B32B 5/16
(52) U.S. Cl. ........................ 428/323; 428/336; 428/523; 525/55; 525/185; 526/348.1
(58) Field of Search ................................ 428/283, 284, 428/285, 286, 297, 354, 402, 406, 903; 525/55, 88, 89, 95, 185, 242, 416; 526/348.1, 352, 352.2

(56) References Cited

U.S. PATENT DOCUMENTS

| | | | |
|---|---|---|---|
| 2,326,634 A | 9/1943 | Gebhard et al. | 88/82 |
| 2,354,018 A | 7/1944 | Heltzer et al. | 88/82 |
| 2,354,048 A | 7/1944 | Palmquist et al. | 40/135 |
| 2,354,049 A | 7/1944 | Palmquist et al. | 40/135 |
| 2,379,702 A | 7/1945 | Gebhard et al. | 88/82 |
| 2,379,741 A | 7/1945 | Palmquist et al. | 88/82 |
| 2,407,680 A | 9/1946 | Palmquist et al. | 88/82 |
| 3,190,178 A | 6/1965 | McKenzie et al. | 88/82 |
| 3,278,646 A | 10/1966 | Lambert et al. | 260/897 |
| 3,341,626 A | 9/1967 | Peterkin | 260/897 |
| 3,361,849 A | 1/1968 | Cramer et al. | 260/897 |
| 3,551,025 A | 12/1970 | Bingham | 350/105 |
| 3,565,985 A | 2/1971 | Schrenk et al. | 264/171 |
| 3,666,836 A | 5/1972 | John | 260/897 |
| 3,795,435 A | 3/1974 | Schwab | 350/105 |
| 3,983,206 A | 9/1976 | Juba et al. | 264/255 |
| 4,020,194 A | 4/1977 | McIntyre et al. | 427/172 |
| 4,025,159 A | 5/1977 | McGrath | 350/105 |
| 4,032,493 A | 6/1977 | Pascual | 260/897 |
| 4,048,376 A | 9/1977 | Unmuth | 428/461 |
| 4,081,415 A | 3/1978 | Matubara et al. | 260/28.5 |
| 4,115,620 A | 9/1978 | Gupta et al. | 428/374 |
| 4,279,659 A | 7/1981 | Unmuth | 106/230 |
| 4,289,831 A | 9/1981 | Last | 428/515 |
| 4,394,235 A | 7/1983 | Brandt et al. | 204/165 |
| 4,530,859 A | 7/1985 | Grunzinger, Jr. | 427/385.5 |
| 4,663,213 A | 5/1987 | Bailey et al. | 428/204 |
| 4,664,966 A | 5/1987 | Bailey et al. | 428/203 |
| 4,692,370 A | 9/1987 | Reckziegel et al. | 428/198 |
| 4,950,525 A | 8/1990 | Bailey | 428/164 |
| 4,999,231 A | 3/1991 | Fowler | 428/95 |
| 5,047,462 A | 9/1991 | Kehr et al. | 524/423 |
| 5,064,272 A | 11/1991 | Bailey | 359/541 |
| 4,786,533 A | 11/1988 | Crass et al. | |

(List continued on next page.)

FOREIGN PATENT DOCUMENTS

| | | |
|---|---|---|
| EP | 0 399 792 A3 | 11/1990 |
| EP | 0 399 792 A2 | 11/1990 |
| EP | 0 557 573 A2 | 9/1993 |

(List continued on next page.)

Primary Examiner—Robert Dawson
Assistant Examiner—Christopher M Keehan
(74) Attorney, Agent, or Firm—Carolyn A. Bates

(57) ABSTRACT

A retroreflective article comprising a plurality of retroreflective elements and a film comprising a blend of polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that the film is substantially vinyl-like. The articles can be used, for example, in reflective footwear, apparel, safety wear, sweatbands, piping and adornments.

50 Claims, 16 Drawing Sheets

U.S. PATENT DOCUMENTS

| | | | |
|---|---|---|---|
| 5,069,964 A | 12/1991 | Tolliver et al. | 428/325 |
| 5,085,943 A | 2/1992 | Crighton et al. | 428/500 |
| 5,091,237 A | 2/1992 | Schloegl et al. | 428/215 |
| 5,112,674 A | 5/1992 | German et al. | 428/216 |
| 5,128,183 A | 7/1992 | Buzio | 428/35.7 |
| 5,132,074 A | 7/1992 | Isozaki | 264/564 |
| 5,138,488 A | 8/1992 | Szchecz | 359/529 |
| 5,171,628 A | 12/1992 | Arvedson et al. | 428/224 |
| 5,194,113 A | 3/1993 | Lasch et al. | |
| 5,212,009 A | 5/1993 | Peiffer et al. | 428/220 |
| 5,213,744 A | 5/1993 | Bossaert | 264/171 |
| 5,246,659 A | 9/1993 | Crignton et al. | 264/290.2 |
| 5,248,719 A | 9/1993 | Kehr et al. | 524/423 |
| 5,290,635 A | 3/1994 | Matsumura et al. | 428/516 |
| 5,316,838 A * | 5/1994 | Crandall et al. | 428/283 |
| 5,389,324 A | 2/1995 | Lewis et al. | 264/171 |
| 5,427,842 A | 6/1995 | Bland et al. | 428/213 |
| 5,450,235 A | 9/1995 | Smith et al. | 359/529 |
| 5,451,455 A | 9/1995 | Peiffer et al. | 425/323 |
| 5,460,861 A | 10/1995 | Vicik et al. | 428/34.9 |
| 5,472,764 A | 12/1995 | Kehr et al. | 428/96 |
| 5,543,223 A | 8/1996 | Shah et al. | 428/349 |
| 5,560,948 A | 10/1996 | Peiffer et al. | 426/127 |
| 5,589,122 A | 12/1996 | Leonard et al. | 264/146 |
| 5,599,602 A | 2/1997 | Leonard et al. | 428/56 |
| 5,614,286 A | 3/1997 | Bacon et al. | 428/161 |
| 5,658,670 A * | 8/1997 | Fukushi et al. | 428/421 |
| 5,660,922 A | 8/1997 | Herridge et al. | 428/214 |
| 5,691,846 A | 11/1997 | Benson et al. | 359/530 |
| 5,706,132 A | 1/1998 | Nestegard et al. | 359/529 |
| 5,714,223 A | 2/1998 | Araki et al. | 428/68 |
| 5,721,086 A | 2/1998 | Emslander et al. | 430/126 |
| 5,743,981 A * | 4/1998 | Lu | 156/182 |
| 5,754,338 A | 5/1998 | Wilson et al. | 359/530 |
| 5,777,055 A | 7/1998 | Peiffer et al. | 526/348.1 |
| 5,784,198 A | 7/1998 | Nagaoka | 359/534 |
| 5,812,316 A | 9/1998 | Ochi et al. | 359/530 |
| 5,882,771 A | 3/1999 | Klein et al. | 428/161 |
| 5,914,812 A | 6/1999 | Benson et al. | 359/529 |
| 5,941,655 A | 8/1999 | Jacobs et al. | |
| 6,074,719 A | 6/2000 | Fukushi et al. | |
| 6,106,982 A | 9/2000 | Mientus et al. | 430/14 |
| 6,156,252 A | 12/2000 | Freedman | 264/173.15 |

FOREIGN PATENT DOCUMENTS

| | | |
|---|---|---|
| EP | 0 763 422 A1 | 3/1997 |
| EP | 0 681 914 B1 | 2/1998 |
| JP | 2000-273250 | 10/2000 |
| WO | WO 98/38041 | 9/1998 |
| WO | WO 98/44065 | 10/1998 |
| WO | WO 99/02331 | 1/1999 |
| WO | WO 99/28128 | 6/1999 |
| WO | WO 99/51432 | 10/1999 |
| WO | WO 00/05305 | 2/2000 |

* cited by examiner

RETROREFLECTIVE ARTICLE AND METHOD

TECHNICAL FIELD

The invention relates to retroreflective articles and other articles useful for various applications, such as reflective footwear, reflective apparel, and retroreflective signage and pavement markings.

BACKGROUND OF THE INVENTION

Plasticized polyvinyl chloride (PVC) films and tapes are conventionally used for a wide variety of retroreflective article applications including reflective footwear, reflective apparel, and retroreflective signage and pavement markings. PVC has many advantages that have caused it to become a material of choice in such applications. For example, plasticized PVC films can readily be applied to many irregular surfaces. Thus a PVC-based retroreflective sheet can be heated slightly above room temperature and stretched over rivets and into small indentations such as may be present on the substrates to which such retroreflective sheets may be applied. Many materials that have been tried as substitutes for PVC have been found to undergo necking or other non-affine deformation when stretched, thus rendering such materials unsuitable for applications in which non-uniform distortion during stretching would be unacceptable.

Plasticizers are typically employed in PVC films in order to make the films more flexible and more stretchable. However, PVC plasticizers can degrade the performance of adjacent adhesive layers, reducing the adherence of a retroreflective sheet to a substrate. PVC plasticizers can also migrate into and thereby degrade the performance of retroreflective sheeting.

In addition, there is growing concern, particularly in European and Japanese markets, about the environmental impact of land filling or incinerating PVC materials. PVC has only limited recycling utility.

A variety of stiff, relatively high modulus packaging films (e.g., twist films for candy wrapping) have been made from isotactic (crystalline) polypropylene and hydrocarbon resins, including the films described in U.S. Pat. Nos. 3,278,646; 3,361,849; 3,666,836; 4,032,493; 4,289,831; 4,394,235; 5,091,237; 5,128,183; 5,212,009; 5,213,744; 5,246,659; 5,290,635; 5,451,455; 5,543,223; 5,560,948 and 5,777,055; and in European Patent Specification No. EP 0 681 914 B1. U.S. Pat. No. 5,085,943 also describes a twist film made from polypropylene and hydrocarbon resin, the film being said to have increased stiffness. PCT International Application Nos. WO 98/38041, WO 99/2331 and WO 99/51432 describe multilayer films having a core layer that contains isotactic propylene and various modifiers including a tactic polypropylene. European Patent Specification No. EP 0 763 422 A1 refers to various multilayer films containing low-modulus polypropylene in an interior layer, and refers to but does not exemplify film layers containing a blend of low-modulus polypropylene and hydrocarbon resin.

Fibers made from isotactic polypropylene and hydrocarbon resins are described in, for example, U.S. Pat. Nos. 4,115,620 and 5,171,628, and in European Patent Application No. 0 399 792 A3.

Hot melt adhesives, sealants and other compositions containing, inter alia, atactic (amorphous) polypropylene and various hydrocarbon resins are described in many references, including U.S. Pat. Nos. 3,341,626; 3,983,206; 4,048,376; 4,081,415 and 4,279,659. U.S. Pat. No. 4,999,231 describes cast hot melt adhesive films for use on carpet backing, wherein the films contain, inter alia, atactic polypropylene, hydrocarbon resin and calcium carbonate filler. U.S. Pat. No. 4,692,370 describes a fibrous coating made from blown strands of a hot melt material made from, inter alia, atactic polypropylene and a polyterpene resin. U.S. Pat. Nos. 5,047,462; 5,248,719 and 5,472,764 describe coating compositions containing, inter alia, various atactic copolymers and hydrocarbon resin. European Patent Application No. 0 557 593 A2 describes packaging films containing, inter alia, a hydrocarbon resin and a wax. Atactic polypropylene is mentioned as one possible wax.

PVC replacement films are described in, for example, U.S. Pat. Nos. 5,112,674; 5,132,074 and 5,460,861.

SUMMARY OF THE INVENTION

The present invention provides, in one aspect, a retroreflective article comprising a plurality of retroreflective elements and a film comprising a blend of polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that the film is substantially vinyl-like. In some embodiments of the invention, the film is elastomeric, and in other embodiments the film is non-elastomeric. In further embodiments of the invention, the film is conformable, drapable or affinely deformable by hand. In yet further embodiments, the films are oriented sufficiently so that the film has a deformation index that is less than about 1.1.

In another aspect, the invention provides retroreflective articles comprising a plurality of retroreflective elements and a multilayer film comprising a core of the above-mentioned blend and one or more additional layers made of a different material.

The invention also provides a method for making a retroreflective article comprising the steps of providing a retroreflective member having a plurality of retroreflective elements; extruding a film comprising a layer of the above-mentioned blend; and attaching the film to the retroreflective member.

The invention provides retroreflective articles having vinyl-like features and behavior. The retroreflective articles and method of the invention can be tailored to provide specific desired physical properties at room temperature (20° C.) and at elevated temperatures, and can provide workable substitutes for retroreflective articles employing existing plasticized PVC films. At present raw material pricing, the invention enables a desirable reduction in raw material cost compared to many PVC films.

These figures, which are idealized, are not to scale and are intended to be merely illustrative and non-limiting.

DETAILED DESCRIPTION

The retroreflective elements in a retroreflective article typically are beads (e.g., transparent glass or ceramic spheres) or microstructured prisms (e.g., cube-corner reflectors or other prismatic structures). The elements typically retroreflect incident light via a light path that involves passage through the element, reflection from a suitable coating (e.g., a metal layer) or other interface (e.g., an air interface) located in a cooperative optical relationship behind the element, and passage back through the element and thence towards the light source. Suitable retroreflective articles include beaded and prismatic articles of the exposed element, enclosed element, or encapsulated element type. Illustrative examples of exposed lens retroreflective articles include those disclosed in U.S. Pat. Nos. 2,326,634 (Gebhard et al.); U.S. Pat. No. 2,354,018 (Heltzer et al.); U.S. Pat. No. 2,354,048 (Palmquist); U.S. Pat. No. 2,354,049 (Palmquist); U.S. Pat. No. 2,379,702 (Gebhard); and U.S. Pat. No. 2,379,741 (Palmquist).

Illustrative examples of enclosed lens retroreflective articles include those disclosed in U.S. Pat. Nos. 2,407,680 (Palmquist et al.); U.S. Pat. No. 3,551,025 (Bingham et al.); U.S. Pat. No. 3,795,435 (Schwab); U.S. Pat. No. 4,530,859 (Grunzinger, Jr.); U.S. Pat. No. 4,664,966 (Bailey et al.); U.S. Pat. No. 4,950,525 (Bailey); U.S. Pat. No. 5,064,272 (Bailey et al.); and U.S. Pat. No. 5,882,771 (Klein et al.). Illustrative examples of encapsulated lens retroreflective articles include those disclosed in U.S. Pat. Nos. 3,190,178 (McKenzie); U.S. Pat. No. 4,025,159 (McGrath); U.S. Pat. No. 4,663,213 (Bailey et al.); U.S. Pat. No. 5,069,964 (Tolliver et al.); U.S. Pat. No. 5,714,223 (Araki et al.); U.S. Pat. No. 5,812,316 (Ochi et al.); and U.S. Pat. No. 5,784,198 (Nagaoka). Illustrative examples of prismatic-type retroreflective articles include those disclosed in U.S. Pat. Nos. 5,138,488 (Szczech); U.S. Pat. No. 5,450,235 (Smith et al.); U.S. Pat. No. 5,614,286 (Bacon et al.); U.S. Pat. No. 5,691,846 (Benson et al.); U.S. Pat. No. 5,706,132 (Nestegard et al.); U.S. Pat. No. 5,714,223 (Araki et al.); U.S. Pat. No. 5,754,338 (Wilson et al.); and U.S. Pat. No. 5,914,812 (Benson et al.)

Figure 1:
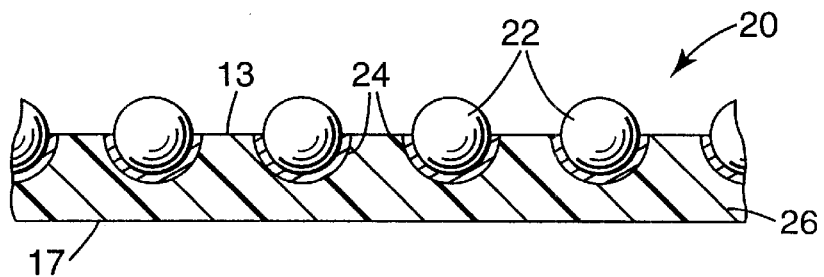
FIG. 1 is a cross-sectional view of an exposed lens retroreflective article.

FIG. 1 illustrates an exposed lens retroreflective article 20 having a bead bond layer 26 with a first major viewing surface 13 and an opposed major surface 17. In one embodiment of our invention, the bead bond layer 26 can be formed from the above-described blend of polyolefin and hydrocarbon resin, and can carry a plurality of transparent beads 22. The beads have an air-exposed portion and an opposing hemispherical portion having a reflective coating 24 thereon. Such exposed lens articles may be useful, for example, as reflective trim for apparel or footwear and as sheeting on traffic cones.

Figure 2:
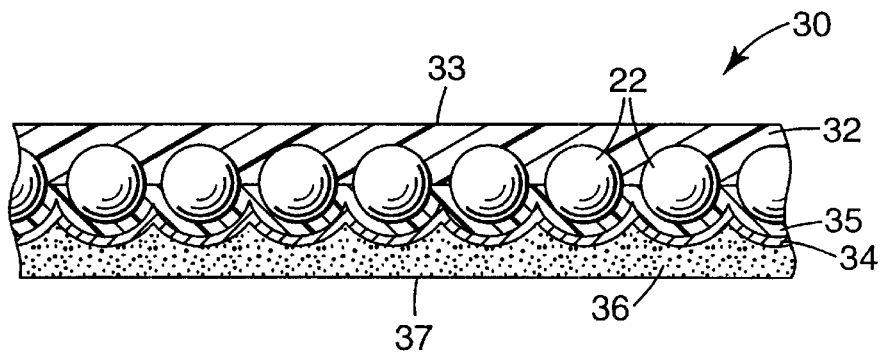
FIG. 2 and FIG. 3 are cross-sectional views of an enclosed lens retroreflective article.

FIG. 2 illustrates an enclosed lens retroreflective article 30 having a face member 32 with viewing surface 33 and an opposed major surface 37 having an adhesive layer 36 thereon. Transparent beads 22 have a first hemispherical portion enclosed by face member 32, and a second opposing hemispherical portion held by space coat layer 35 in a cooperative position with respect to reflective layer 34. The face member 32 can be formed from the above-described blend of polyolefin and hydrocarbon resin. Such enclosed lens articles may be useful, for example, as reflective sheeting for highway signage or license plates.

Figure 3:
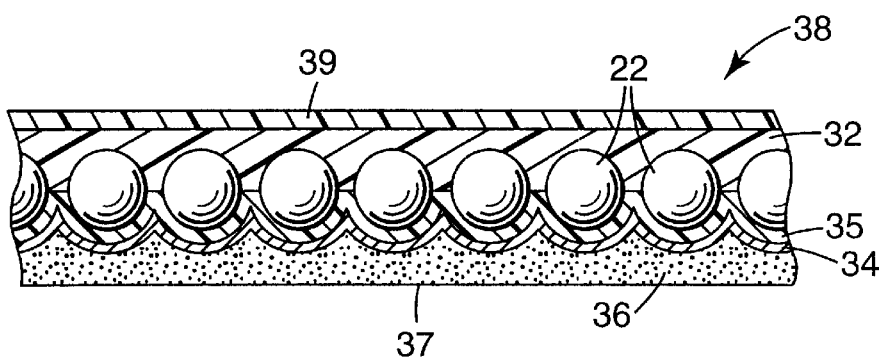

FIG. 3 illustrates an enclosed lens retroreflective article 38 like that of FIG. 2, but having a transparent topcoat 39 thereon. The transparent topcoat 39, or the face member 32, can be formed from the above-described blend of polyolefin and hydrocarbon resin. Such enclosed lens articles may be useful, for example, in highway signage, license plates or pavement markings.

Figure 4:
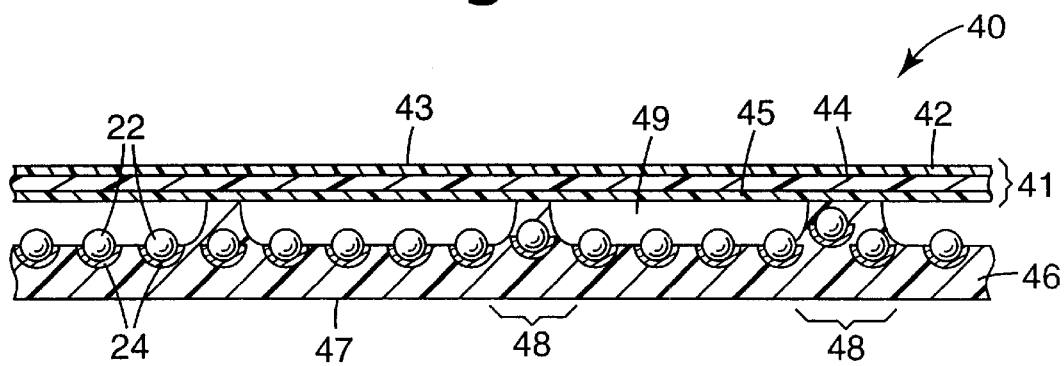
FIG. 4 is a cross-sectional view of an encapsulated lens retroreflective article.

FIG. 4 illustrates an encapsulated lens retroreflective article 40 whose multilayer face member 41 has viewing surface 43, an air exposed layer 42 that is capable of withstanding weather, a core layer 44, and an underlying layer 45 capable of bonding to the sealing member 46 through a pattern of seal legs 48. Transparent beads 22 have a first hemispherical air exposed portion, and a second opposing hemispherical portion having reflective coating 24 thereon and embedded in sealing member 46. Sealing member 46 has a major surface 47 opposed from viewing surface 43. The face member 41, sealing member 46 and the pattern of seal legs 48 form a plurality of encapsulated air cells 49 surrounding the air exposed portion of beads 22. The core layer 44, exposed layer 42 or underlying layer 45 of face member 41 can be formed from the above-described blend of polyolefin and hydrocarbon resin. Such encapsulated lens articles may be useful, for example, as a reflective surface on emergency markers (e.g., marine applications for safety of life at sea) and as sheeting for highway signage.

Figure 5:
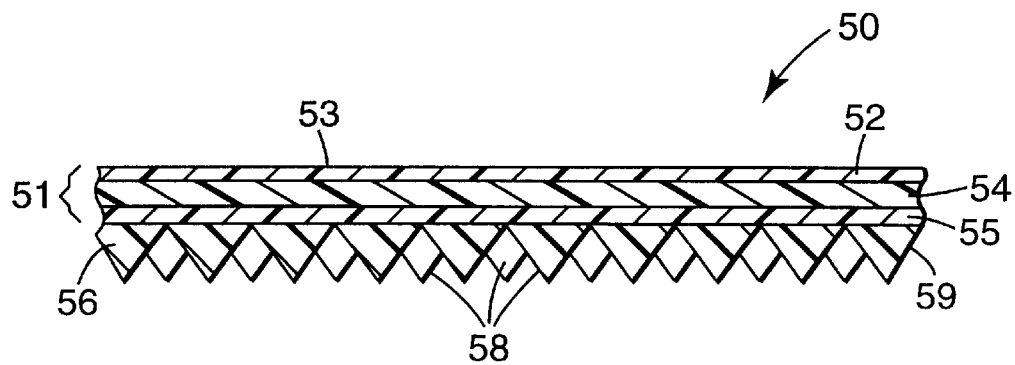
FIG. 5 is a cross-sectional view of an exposed prismatic-type retroreflective article.

FIG. 5 illustrates a reflector-coated prismatic-type retroreflective article 50 having a multilayer face member 51 with a major viewing surface 53, an air exposed layer 52 that is capable of withstanding weather or laundering, a core layer 54, and an underlying layer 55 capable of bonding to the retroreflective elements 56. Retroreflective elements 56 have microstructured prism faces 58 which can be uncoated or can have an optional reflective coating 59 thereon. The retroreflective elements 56 can be formed in a variety of ways, including casting a light-curable syrup in a suitable mold, embossing a thermoplastic film, and other techniques that will be familiar to those skilled in the art. The core layer 54, exposed layer 52 or underlying layer 55 of face member 51 can be formed from the above-described blend of polyolefin and hydrocarbon resin. The exposed layer 52 and underlying layer 55 can be the same as one another or different. Prismatic retroreflective articles such as article 50 may be useful, for example, on reflective footwear, reflective apparel, and as sheeting for highway signage.

Figure 6:
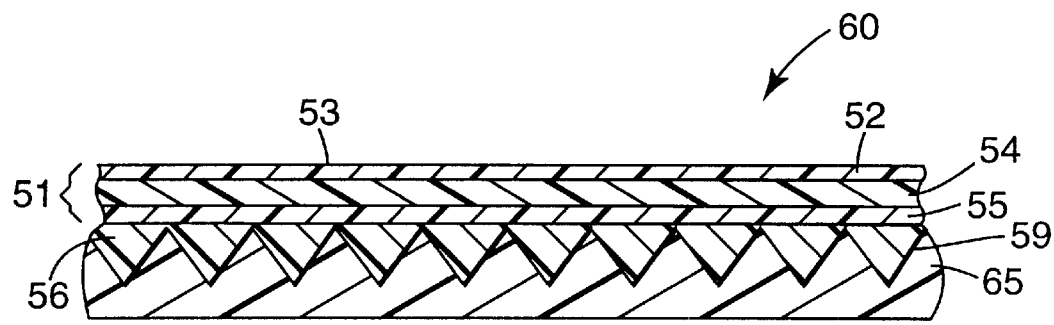
FIG. 6 is a cross-sectional view of an enclosed prismatic-type retroreflective article.

FIG. 6 illustrates a prismatic retroreflective article 60 like that of FIG. 5, but having an underlying layer 65 that lies against the optional reflective coating 59, thereby protecting it from environmental effects and enclosing the retroreflective elements 56.

The underlying layer 65, core layer 54, exposed layer 52 or underlying layer 55 can be formed from the above-described blend of polyolefin and hydrocarbon resin. The exposed layer 52 and underlying layer 55 can be the same as one another or different. Prismatic retroreflective articles such as article 60 may be useful, for example, on reflective footwear, reflective apparel, and as sheeting for highway signage.

Figure 7:
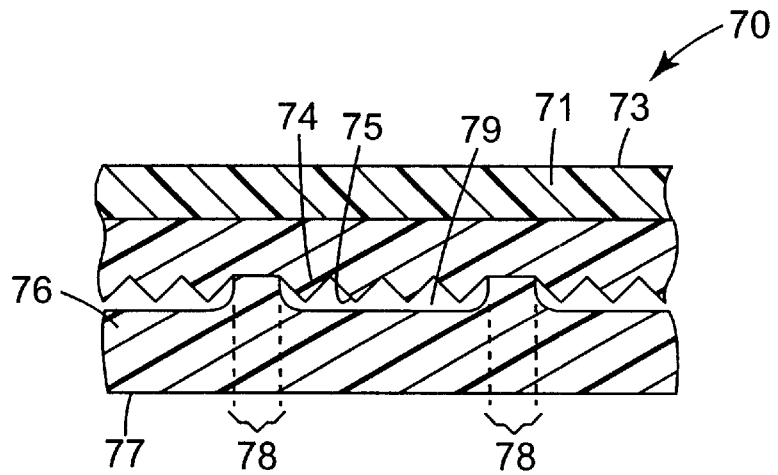
FIG. 7 is a cross-sectional view of an encapsulated prismatic-type retroreflective article.

FIG. 7 illustrates a cross-sectional view of an encapsulated prismatic-type retroreflective article 70 having a face member 71 with major viewing surface 73, retroreflective member 74 having retroreflective elements 75 forming a microstructured surface, and sealing member 76 having a major surface 77. As will be understood by those skilled in the art, sealing member 76 can be bonded to the microstructured surface, or to the interior of retroreflective member 74, or to face member 71 to form seal legs 78 surrounding a plurality of encapsulated air cells 79. The face member 71 or sealing member 77 can be formed from the above-described blend of polyolefin and hydrocarbon resin. The retroreflective member 74 can also be a so-called "raised-ridge" member such as is shown in the above-mentioned U.S. Pat. No. 5,914,812. Such prismatic retroreflective articles may be useful, for example, on reflective footwear, reflective apparel, and as sheeting for highway signage.

Figure 8:
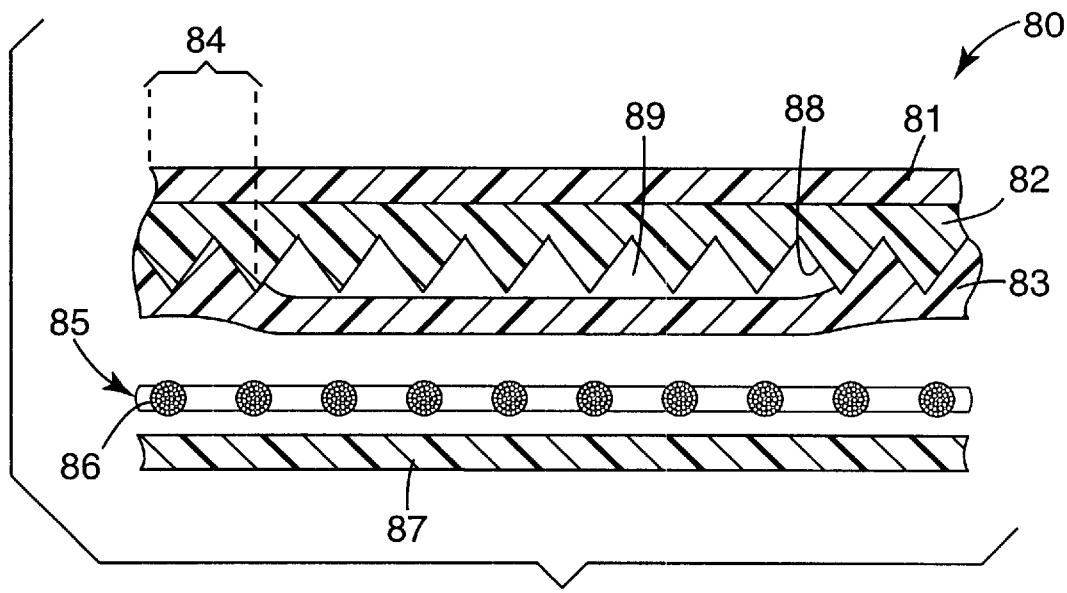
FIG. 8 is an exploded cross-sectional view of a roll-up sign article.

FIG. 8 illustrates an exploded cross-sectional view of a roll-up sign 80 having face member 81, retroreflective member 82, sealing member 83, scrim 85 (including multifilament strands 86) and backing member 87. In one preferred embodiment, sealing member 83 forms seal legs 84 with retroreflective member 82 (or if desired, with face member 81) to define air cells 89 behind prisms 88. When the sign is assembled, backing member 87 and sealing member 83 encapsulate scrim 85. The face member 81, sealing member 83 or backing member 87 can be formed from the above-described blend of polyolefin and hydrocarbon resin.

Figure 9A:
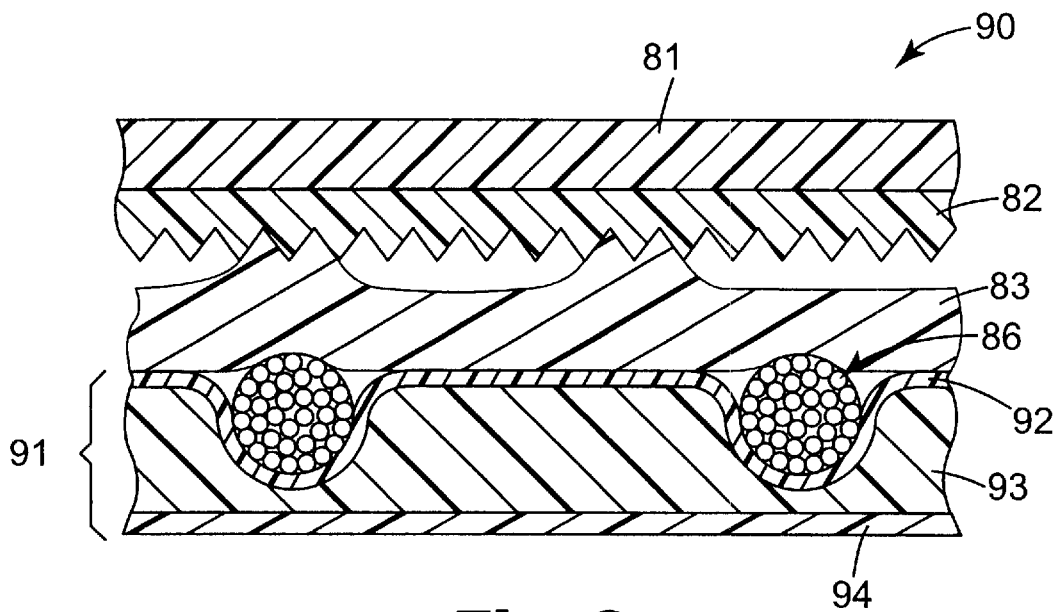
FIG. 9a is a cross-sectional view of a flexible retroreflective article made by bonding the backing member of FIG. 8 to the encapsulated prismatic-type retroreflective article of FIG. 7.

FIG. 9a illustrates a cross-sectional view of a retroreflective article 90 generally like that of FIG. 8, but made using a multilayer film 91 in place of the backing member 87. Multilayer film 91 has an inner sealing layer 92, a core layer 93 and an outer layer 94. The inner sealing layer 92, core layer 93 or outer layer 94 can be formed from the above-described blend of polyolefin and hydrocarbon resin.

Figure 9B:
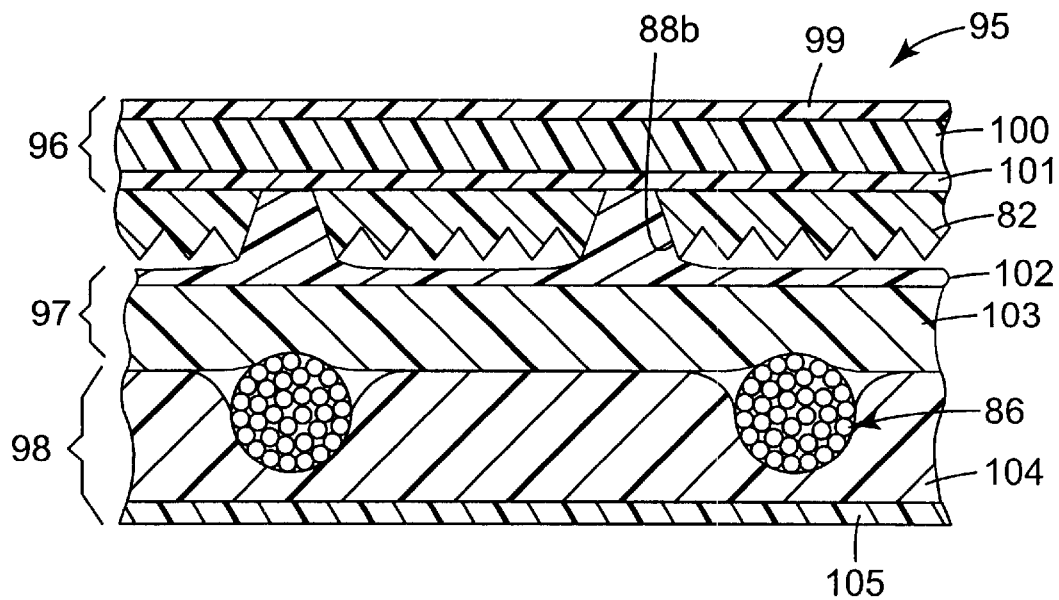
FIG. 9b is a cross-sectional view of another flexible retroreflective article.

FIG. 9b illustrates a cross-sectional view of a retroreflective article 95 generally like that of FIG. 8, but made using multilayer films 96, 97 and 98 in place of the face member 81, sealing member 83 and backing member 87, respectively, and using a different seal leg construction. The multilayer face member 96 has an air-exposed layer 99, a core layer 100 and an underlying layer 101. The retroreflective member 82 has prisms 88. The multilayer sealing member 97 has a bonding layer 102 bonded to underlying layer 101 through seal legs 88b and a core layer 103 capable of bonding to the multilayer backing member 98. Backing member 98 has a core layer 104 with a weatherable layer 105 laminated thereto. Scrim strands 86 are sandwiched between sealing member 97 and backing member 98. One or more of the layers of the multilayer films 96, 97 and 98 can be formed from the above-described blend of polyolefin and hydrocarbon resin.

Figure 10:
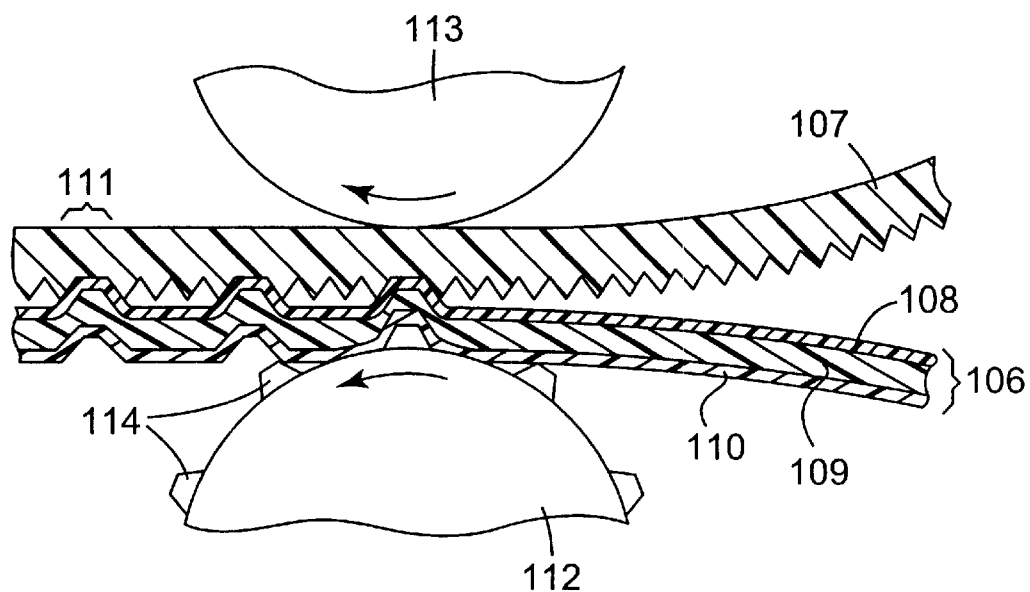
FIG. 10 is a side view of a lamination process useful for making an encapsulated prismatic-type retroreflective article.

FIG. 10 illustrates one method for making flexible retroreflective articles having multilayer film 106 and retroreflective member 107 by thermal lamination. Multilayer film 106 has sealing layer 108, core layer 109 and weatherable layer 110. The sealing layer 108 and weatherable layer 110 can be the same as one another or different. In a typical thermoforning technique for making seal legs 111, the multilayer film 106 and retroreflective member 107 are passed between patterned embossing roller 112 and opposing roll 113. Patterned protrusions 114 on the embossing roll 113 force the sealing layer 108 into some of the depressions 111 on retroreflective member 107. The temperature of embossing roll 112 is preferably kept hot enough so that a durable thermal bond forms at the seal legs 111. The opposing roll 113 can be kept near ambient temperature. If desired, the sealing layer can be pushed deeply into retroreflective member 107, below the base of the prisms, and into an underlying layer (not shown in FIG. 10), if present. In addition to thermoforning techniques, other techniques, such as ultrasonic welding, radio frequency welding, thermal fusion, and reactive welding, can also be used.

The above-mentioned blend of polyolefin and hydrocarbon resin can be employed in a retroreflective article in a fashion generally similar to existing PVC films. However, the physical properties of the blend can be manipulated in certain respects, as will be discussed in more detail below. Thus the blends can mimic, or may deliberately differ from the behavior of PVC in retroreflective articles. Some of the blends are described in copending application Ser. No. 09/783,356 entitled "REPLACEMENT FOR PLASTICIZED POLYVINYL CHLORIDE", filed Feb. 14, 2001, the disclosure of which is incorporated herein by reference.

We have observed that the measured physical properties of some blends used in the invention may change shortly after the blend is prepared. Thus we prefer to measure such properties by forming the blend, processing it into a film, and then waiting at least another 7 to 10 days (more preferably at least about 1000 hours) before performing physical property measurements. Usually we desire to form the blends and then immediately process the blend into a finished film. However, because of the changing nature of the physical properties of some blends used in the invention, it may be desirable in some cases to form the blends, wait for a suitable time so that the physical properties of the blend reach a desired state and process the blend into a finished shape.

As used in connection with this invention, the term "vinyl-like" will be used to refer to the characteristics of a film sample having a thickness of about 0.05 to 0.1 mm, aged at least 7 to 10 days as described above. This characteristic can be evaluated by hand at room temperature. A film sample can be evaluated to determine if it is substantially vinyl-like by placing a film sample between a thumb and index finger and flexing or otherwise feeling the film sample to detect whether it resembles a plasticized PVC film sample of similar caliper.

Some of the blends used in the invention are "non-elastomeric". A film sample can be evaluated to determine if it is non-elastomeric by marking two spaced fiducial marks on the film sample, elongating the film sample until the length between the fiducial marks doubles (or in other words, until the sample has been elongated by 100%), allowing the elongated sample to relax unrestrained (e.g., on a bench top), and measuring the length between the fiducial marks after 5 minutes. For a non-elastomeric film sample, the length between the fiducial marks will be at least 150% of the original length after five minutes. For some blends or methods of the invention, the film sample will undergo further relaxation and the length between the fiducial marks will be less than 150% of the original length after 24 hours. Such further relaxation is not required, however, and for a preferred subclass of the blends and methods of the invention the length between the fiducial marks will remain at least 150% of the original length after 24 hours.

Some embodiments of the invention employ blends whose films are conformable, drapable, affinely deformable, or any combination of these characteristics. These terms will be used to refer to the characteristics of a film sample having a thickness of about 0.05 to 0.1 mm, aged at least 7 to 10 days as described above. These characteristics can also be evaluated by hand at room temperature. A film sample can be evaluated to determine whether it is substantially "conformable" by holding a 10 cm square piece of the film sample taut and attempting to push a thumb through the film sample, without rupturing the film sample, to determine whether at least a 2 cm deep, substantially conforming thumb indentation can be made in the film and whether at least a 1 cm deep indentation will remain just after the thumb is removed. A film sample can be evaluated to determine whether it is substantially "drapable" by hanging a 5 mm wide and 10 cm long piece of the film sample over a horizontally-extended index finger to detect whether the ends of the film sample hang vertically. A film sample can be evaluated to determine whether it is substantially "affinely deformable" by grasping the ends of a 1 cm wide and 10 cm long film sample and pulling the ends of the film sample apart for approximately 5 cm to determine whether the film sample will deform without the occurrence of a visible neck or cold draw zone that localizes the deformation. Affine deformation is further explained in F. Rodriguez, Principles of Polymer Systems, p. 199 (McGraw Hill, 1970) as follows: "When we stretch the whole piece of rubber, we move the ends of the segment to new positions in the same proportion as we do the whole piece."

The above-described characteristics can also be evaluated using film samples having other calipers if desired. Those skilled in the art will understand that if a film sample with a caliper greater than 0.1 mm has one or more of the above characteristics then films with a caliper of about 0.1 mm will likely do so as well. Those skilled in the art will also appreciate that the desired caliper of a film of the invention will vary depending upon the intended retroreflective article application, and that films having a variety of calipers can be employed, including films whose calipers are less than 0.05 mm or greater than 0.1 mm.

A variety of polyolefins can be used in the invention. Preferably the polyolefin is a polymer of a monomer or a copolymer of monomers having at least two carbon atoms. Polyolefins for use in the invention can include more than one type of structure throughout their chain length. For example, the polyolefin can include stereoregular isotactic or syndiotactic structures, as well as amorphous, atactic structures, or combinations thereof. "Isotactic" polymers, as defined by Hawley's Condensed Chemical Dictionary (12th Edition), are those whose structure is such that groups of atoms that are not part of the backbone structure are located either all above, or all below, atoms in the backbone chain, when the latter are all in one plane. "Syndiotactic" polymers, as defined by Hawley's Condensed Chemical Dictionary (12th Edition), are those whose structure is such that groups of atoms that are not part of the backbone structure are located in some symmetrical and recurring fashion above and below the atoms in the backbone chain, when the latter are all in one plane. "Atactic" polymers, as defined by *Hawley's Condensed Chemical Dictionary* (12$^{th}$ Edition), are those whose structure is such that groups of atoms are arranged randomly above and below the backbone chain of atoms, when the latter are all in one plane. It is generally understood that substantially atactic polymers are amorphous, and lack a well-defined crystalline melting point.

Neither highly stereoregular isotactic or syndiotactic nor highly atactic polyolefins are desired for use in the present invention. Use of excessively stereoregular (highly crystalline) polyolefins will make films containing such polyolefins overly stiff and inflexible, thus detracting from the desired vinyl-like behavior. Unless the molecular weight of the polymer is sufficiently high, use of excessively amorphous polyolefins will make films containing such polyolefins excessively soft and weak. Thus the polyolefin should be sufficiently semicrystalline and of a suitable molecular weight, or the polyolefin should be amorphous and of should be of sufficiently high molecular weight, so that a film made from the polyolefin and the hydrocarbon resin is substantially vinyl-like as described above. The required degrees of crystallinity (in the case of a semicrystalline material) and molecular weight (in the case of a semicrystalline or amorphous material) will depend in part on the relative amounts and type of polyolefin and hydrocarbon resin employed. It will also depend on whether orientation is employed, since as discussed in more detail below, for some blends the use of orientation will enable an otherwise brittle blend to be processed into a substantially vinyl-like film.

Polyolefins for use in the invention include polyethylenes or polypropylenes such as ethylene or propylene copolymers, mixed tacticity polypropylenes, ethylene/propylene copolymers, ethylene/propylene/1-butene terpolymers, ethylene/butene copolymers (e.g., ethylene/1-butene copolymers), propylene/butene copolymers (e.g., propylene/1-butene copolymers), ethylene/hexene copolymers, ethylene/octene copolymers, ethylene/methyl acrylate and ethylene/styrene copolymers. Preferred polyolefins include those known as "Flexible Polyolefin" ("FPO") or "Thermoplastic Polyolefin" ("TPO") alloys, such as the REXFLEX™ FPO 100, 200 and 300 series polypropylenes and REXFLEX™ WL203 polypropylene (formerly available from Huntsman Corp.); ADFLEX™ thermoplastic polyolefins and Polybutene 1710A from Basell Polyolefins; ATTANE™, AFFINITY™ and INDEX™ ethylene copolymers from Dow Chemical Co.; EASTOFLEX™ atactic polypropylene or propylene/ethylene copolymers from Eastman Chemical Products; ENGAGE™ polyolefins from DuPont Dow Elastomers; EXACT™ ethylene copolymers such as the D201 through 9018 series copolymers from Exxon Chemical Products; "EOD" series syndiotactic propylenes such as EOD 9628, "Type 4280" modified polypropylene and Z9470 propylene/ethylene copolymer from Fina Oil and Chemical Co.; VESTOPLAST™ ethylene/propylene/butene copolymers from Creanova Inc., a subsidiary of Degussa-Huls Corp.; and blends thereof.

A variety of hydrocarbon resins can be used in the invention. Suitable hydrocarbon resins have an aliphatic, aromatic or mixed aliphatic and aromatic structure. Normally the hydrocarbon resin will contain some degree of unsaturation. However, the hydrocarbon resin can be fully or partially hydrogenated in order to alter the degree of unsaturation and other properties of the hydrocarbon resin such as its Tg or its thermal oxidative stability. The polymerization conditions or other process parameters can also be varied to alter resin properties such as color, molecular weight, melt viscosity and the like. Suitable hydrocarbon resins include the PICCOT™, PICCODIENE™ and PICCOVAR™ series of aromatic hydrocarbon resins (e.g., PICCO 1104, 2100, 5120, 5140, 6085 and 6100; PICCODIENE 2215; and PICCOVAR AP10 and AP25); the PICCOTAC™ and PICCOPALE™ series of aliphatic hydrocarbon resins (e.g., PICCOTAC 95 and 115; and PICCOPALE 100); the ADTAC™ series of liquid aliphatic hydrocarbon resins (e.g., ADTAC LV); the HERCOTAC™, MBG™ and PICCOLYTE™ series of mixed aromatic and aliphatic hydrocarbon resins (e.g., HERCOTAC AD1115, AD4100, 1148 and 1149; MBG223; and PICCOLYTE HM90, HM106 and C135); the REGALITE™, REGALREZ™ and "DCPD" (dicyclopentadiene) series of partially or fully hydrogenated hydrocarbon resins (e.g., REGALITE V 1100, V1120, V3100, V3120, R1090, R1100, R1125, R5100, R71005, T1090, T1105, T1125 and T1140; and REGALREZ 1018, 1085, 1094, 1126, 1128, 1139, 3102 and 6108); the HERCOLITE™, KRISTALEX™, PICCOTEX™, PICCOLASTIC™ and ENDEX™ series of styrene or methylstyrene "pure monomer" hydrocarbon resins (e.g., KRISTALEX 1120, 3070, 3085, 3100, 3115 and 5140; PICCOTEX 75, LC, 100 and 120; PICCOLASTIC A5, A75 and D125; ENDEX 155 and 160; and HERCOLITE 240 and 290) and the PICCOLYTE™ series of terpene resins, all of which are commercially available from Hercules, Inc.; ARKON™ hydrocarbon resins from Arakawa Chemical; hydrocarbon resins from Arizona Chemical Co.; ESCOREZ™ hydrocarbon resins from Exxon Chemical Co.; hydrocarbon resins from Ferguson & Menzies; WINGTACK™ hydrocarbon resins from Goodyear Chemical; CLEARON™ hydrocarbon resins from Yasuhara Yushi Kogyo; and blends thereof.

Sufficient hydrocarbon resin should be employed so that a film made from the material is substantially vinyl-like and non-elastomeric as described above. The required amount of hydrocarbon resin will depend in part on the amount and type of polyolefin and the type of hydrocarbon resin employed. As a general guide, blends containing at least about 5 wt. %, more preferably at least about 10 or even about 20 wt. %, and most preferably from about 30 wt. % to about 60 wt. % hydrocarbon resin are preferred. At higher hydrocarbon resin contents (e.g., above about 50 wt. %), and depending upon the materials employed, unoriented or only slightly oriented films may exhibit poor (e.g., weak) mechanical properties. However, films containing such higher hydrocarbon resin contents that have been oriented using sufficiently high orientation ratios (e.g., 3×3 or greater) will have improved mechanical properties. The term "orientation ratio" refers to the ratio of the length of a film specimen after stretching to the length of the same specimen prior to its being stretched. Orientation ratios specified in a format such as "3×3" refer to biaxial orientation wherein the indicated orientation ratios are in each of two, usually perpendicular, directions.

Preferably the blend of polyolefin and hydrocarbon resin is "compatible". By this is meant that the blend does not exhibit gross phase separation when viewed using an unaided human eye at room temperature. Compatibility can also be said to be present when the blend exhibits a single Tg or single melting temperature, or when a film made from the blend does not contain discontinuous phase regions (other than crystallites of the polyolefin) having a diameter greater than about 100 nanometers, more preferably not greater than about 20 nanometers, as measured using Scanning Electron Microscopy. Thus a film sample formed from the blend preferably will be substantially clear (e.g., transparent) and substantially free of significant haze or other evidence of gross phase separation. However, the blend need not be completely compatible. In some instances, partially miscible blends may be preferred over fully compatible blends, as a partially miscible blend can exhibit a small secondary Tg peak, and consequently can have broadened use temperatures (e.g., increased low temperature flexibility) compared to a fully compatible blend. In some instances, partially miscible polyolefin mixtures which by themselves exhibit some evidence of incompatibility, will exhibit reduced incompatibility when they are blended with one or more hydrocarbon resins.

For some applications, the articles of the invention form conformable films. Conformability can be evaluated by hand as described above, or by applying circular pieces of film to a 150 mm diameter hemispherical mandrel. Preferably for a conformable film, a film sample of at least 100 mm diameter, more preferably at least 120, and most preferably of at least 140 mm diameter can be applied to the mandrel at room temperature without wrinkling.

For some applications, the articles of the invention form drapable films. Dapability can be evaluated by hand as described above, or by measuring tensile modulus. Tensile modulus is a measure of the stiffness of an article. The tensile modulus of commercially available plasticized PVC materials varies, but for premium grades of plasticized PVC, tensile modulus generally ranges between about 100 and about 1000 MPa at room temperature. Tensile modulus can be evaluated using a tensile to break test as described below in Example 2. The blends of polyolefin and hydrocarbon resin used in the present invention desirably have a sufficiently low tensile modulus so that a film made from the blend will behave like plasticized PVC. Above a sufficiently high orientation ratio (e.g., above about 2×2 or 3×3 orientation), orientation tends to increase the tensile modulus of the oriented blend. However, when compared to the polyolefin alone, the tensile modulus of the blend tends to be stiffer (higher modulus) at lower temperatures and more supple (lower modulus) at elevated temperatures. These characteristics facilitate the manufacture of films having a tensile modulus that mimics the temperature-dependent behavior of plasticized PVC films. For example, by tailoring the amount of hydrocarbon resin and the orientation ratio, the blends of the present invention can be used to fabricate thin films that are sufficiently stiff at room temperature so that they can easily be applied to a substrate, while being Efficiently conformable at slightly elevated temperatures (e.g., by heating the film with a heat gun) so that the films can be coaxed into conformity with surface irregularities in the substrate (e.g., rivets and corrugations on the sides of truck panels). These characteristics are very desirable for films used in some retroreflective articles (e.g., reflective sheeting for canvas-covered trucks), and are very difficult to mimic using other polymers or polymer blends. The perceived stiffness of such a film will be proportional to its tensile modulus and to the cube of the film thickness. Preferably, the film has a tensile modulus less than about 1400 MPa, more preferably between about 10 MPa and about 700 MPa, and most preferably between about 300 and about 650 MPa when measured at room temperature.

For some applications, the articles of the invention form films that are affinely deformable by hand as described above. Affine deformation behavior can be characterized in a variety of ways. For example, the yield behavior of an article can be measured using a stress-strain test, such as is used in Example 2 and shown in FIG. 14a. In general, the yield point is the stress value at which an article undergoes pronounced plastic deformation upon further application of strain. In non-affine deformation, the yield point is manifested in a stress-strain plot as the first point where an increase in strain occurs without an increase in stress. This typically represents a local maximum in the stress-strain curve just as the sample begins to undergo locally non-uniform elongation. Curve 140 in FIG. 14a shows non-affine deformation. Point 143 is the observed yield point for curve 140. In affine deformation, the stress-strain curve typically does not exhibit a local maximum, but instead exhibits stress that increases throughout the course of deformation. Usually, such a curve will exhibit a profound change in slope at some level of strain. That inflection point typically is deemed to be the yield point for an affinely deformable material. Curve 142 in FIG. 14a shows affine deformation. Point 146 is the inflection point and deemed yield point for curve 142.

The yield stress is the stress at the observed or deemed yield point. For non-affine deformation, the draw stress is the local minimum in stress just after the observed yield point. The vertical height of point 143 in FIG. 14a shows the yield stress for curve 140, and the vertical height of point 144 shows the draw stress for curve 140. For affine deformation there is no local minimum in stress after the deemed yield point, and thus no draw stress.

The yield strain is the strain at the observed or deemed yield point. For non-affine deformation, the draw strain is the strain after the observed yield point at which the stress again equals the yield stress. The horizontal extent of point 143 in FIG. 14a shows the yield strain for curve 140, and the horizontal extent of point 145 shows the draw strain for curve 140. For affine deformation there is no local minimum in strain after the deemed yield point, and thus no draw strain.

The "necking index" is the ratio of draw strain to yield strain, and is a number greater than or equal to one. For affine deformation the necking index is deemed to be equal to one.

The "deformation index" is the ratio of yield stress to draw stress, and is a number greater than or equal to one. For affine deformation the deformation index is deemed to be equal to one.

The necking index and deformation index both serve as a measure of deformation non-uniformity. Either index can be used to characterize a material. In the discussion that follows, we will focus on the deformation index. As the deformation index approaches one, deformation of the article becomes more affine. The deformation index of commercially available plasticized PVC materials varies, but for premium grades of plasticized PVC, the deformation index generally ranges between about 1.0 and about 1.1 at room temperature. The blends of polyolefin and hydrocarbon resin used in the present invention desirably have a sufficiently low deformation index so that a film made from the blend will exhibit affine deformability. The addition of the hydrocarbon resin to the polyolefin tends to increase the deformation index of the blend, and orientation tends to decrease the deformation index of the oriented blend. These characteristics facilitate the manufacture of films having a deformation index that mimics the affine deformation behavior of plasticized PVC films. Attainment of affine deformation properties is especially difficult, and of particular importance for retroreflective films. For example, when stretching imaged retroreflective films onto irregular surfaces, the image should not be severely distorted and the intended visual appearance of the image should be preserved. By tailoring the amount of hydrocarbon resin and the orientation ratio, the blends of the present invention can be used to fabricate films that deform affinely while preserving a desirable viscoelastic response of high stress relaxation and low strain recovery. This behavior facilitates manufacture of films having dead stretch hand properties and permanent set characteristics like that exhibited by plasticized PVC. These characteristics are very desirable for retroreflective films, and are very difficult to mimic using other polymers or polymer blends. Preferably, the blend has a deformation index below about 1.2, more preferably below about 1.1, and most preferably is equal to about 1.0.

For some applications, the articles of the invention form films that exhibit "dead stretch" characteristics. By dead stretch we mean that when a retroreflective article of the invention is stretched past its yield point it will evenly deform, and upon removal of the stress will substantially retain its deformed configuration and exhibit minimal recovery. Dead stretch behavior can also be evaluated by hand or by using instruments. When using instruments, dead stretch can conveniently be characterized by measuring residual stress and strain recovery values. Both residual stress and strain recovery are time- and temperature-dependent material properties. Residual stress is a measure of the stress retained by an article that has been stretched by 100% (100% strain) and held in the stretched position for one minute.

Strain recovery is a time- and temperature-dependent measure of the extent to which the stretched article returns toward its original length upon release of the stress. The residual stress and strain recovery values of commercially available plasticized PVC materials vary, but for some premium grades of plasticized PVC, residual stress generally ranges between about 3 and about 10 MPa after 60 seconds at room temperature, and strain recovery generally ranges between about 65 and about 98% after 24 hours at room temperature. The blends of polyolefin and hydrocarbon resin used in the present invention desirably have residual stress and strain recovery values that are selected so that a film made from the blend will behave like plasticized PVC. As a generalization for films of the invention, the residual stress and strain recovery values will vary independently. In other words, changes that cause the residual stress value to increase will often (but not always) cause the strain recovery value to decrease. However, we have found that addition of the hydrocarbon resin to the polyolefin changes the relaxation behavior of the blend at 100% strain in a nonlinear fashion. At lower hydrocarbon resin addition levels, residual stress increases when the orientation ratio is increased. However, at sufficiently high hydrocarbon resin addition levels and sufficiently high orientation ratios, residual stress decreases as the hydrocarbon resin content is increased. Strain recovery tends to decrease as the hydrocarbon resin addition level is increased. This behavior facilitates the manufacture of films having a combination of residual stress and strain recovery values that can closely mimic the behavior of a variety of plasticized PVC films. These characteristics are very desirable for films in retroreflective articles, and are very difficult to mimic using other polymers or polymer blends. Preferably, the blend has a residual stress after 60 seconds at room temperature that is less than about 20 MPa, more preferably less than about 15 MPa, and most preferably less than about 5 MPa. Preferably, the blend has a strain recovery after 24 hours at room temperature that is less than about 80%, more preferably less than about 60% and most preferably less than about 40%.

As a general guide for replacement of PVC in an intended use, the polyolefin, hydrocarbon resin, any optional additional materials and the processing conditions for the blend should be selected to provide a retroreflective article whose properties at the intended use temperature will resemble or improve upon the properties of an otherwise similar retroreflective article made using PVC. The term "intended use temperature" refers to the temperature or range of temperatures to which the retroreflective article will typically be exposed during use (e.g., after application to a substrate). In many cases, the intended use temperature will be room temperature. However, the retroreflective article may be exposed to intended use temperatures considerably above or below room temperature, e.g., when the retroreflective article is applied to a substrate outdoors, or subjected to extended exposure (e.g., one year or more) in outdoor conditions. Those skilled in the art will appreciate that due to the wide variety of potential intended uses and use temperatures, the selected properties can vary widely both in type and magnitude. For example, at room temperature, a retroreflective sheeting backing of the invention preferably has a tensile modulus of from about 10 to about 1000 MPa, more preferably about 15 to about 100 MPa. At the intended use temperature some preferred retroreflective articles of the invention preferably also have an elongation to break of at least about 80%, more preferably at least about 200% when evaluated using ASTM D882-95A.

Some blends used in the invention have better non-blocking properties (that is, the ability to be formed into films that can be wound upon themselves and then unwound without adhering to adjacent film layers) than typical soft PVC films. This aids in roll processing (that is, manufacture on a substantially continuous basis using a web that is wound and optionally unwound and rewound on a roll or rolls) of retroreflective articles containing blends used in the invention.

As noted above, multilayer films can be used in the invention. For example, the films can have a core comprising a blend of polyolefin and hydrocarbon resin and one or more additional (e.g., skin) layers made of a different polymeric material. The additional layers can provide desired surface, bulk or optical properties such as adhesion promotion, adhesive release, increased resistance to blocking, or improvements in properties such as ink receptivity, sewability, launderability, weldability, weathering resistance, scratch or abrasion resistance, solvent resistance, graffiti resistance, or light management (e.g., light scattering, reflection, refraction, polarization, gloss, antireflection, or coloration). The use of additional layers can also assist in reducing the overall cost of a retroreflective article containing the blend. The additional layers can be the same as or different from one another. When melt processing multilayer films of the present invention, the materials in adjacent layers need not be completely chemically or physically compatible or well matched, particularly with respect to melt viscosities, although they can be so matched if desired. Thus although materials in adjacent polymeric flowstreams can have relative melt viscosities (a ratio of their viscosities) within a range of about 1:1 to about 1:2, they do not need to have such closely matched melt viscosities. Rather, the materials in adjacent polymeric flowstreams can have relative melt viscosities of at least about 1:5, and possibly up to about 1:50.

In a preferred method for making multilayer films, the layers are formed at the same time, joined while in a molten state, and cooled. That is, preferably, the layers are substantially simultaneously melt-processed, and more preferably, the layers are substantially simultaneously coextruded. Films formed in this way possess a unified construction and have a variety of useful applications. Such multilayer films have a construction of at least 2 layers, more preferably at least 3 layers. If desired, the layers of multilayer films can also be formed individually and later laminated together, or a layer can be formed as a moving web and subsequent layers cast thereon. A colored additional layer can be formed in a variety of ways, e.g., by adding a dye to the additional layer or by applying an ink or other suitable colorant to the surface of the additional layer. A layer can also be a separate layer such as a protective overlayer or a removable layer such as a release liner.

Representative additional layer materials include ethylene/vinyl acetate copolymers such as those available under the trade designation ELVAX™ from E.I. DuPont de Nemours, Inc.; modified ethylene/vinyl acetate copolymers such as those available under the trade designation BYNEL™ from E.I. DuPont de Nemours, Inc. (e.g., BYNEL 3101 acrylate-modified ethylene vinyl acetate having a 18 wt. % vinyl acetate content, and BYNEL 3860 anhydride-modified ethylene vinyl acetate); copolymers of ethylene and methyl acrylate such as that commercially available under the trade designation POLY-ETH 2205 EMA™ from Gulf Oil and Chemicals Co.; ethylene/(meth) acrylic acid copolymer such as that available under the trade designation SURLYN™ from E.I. DuPont de Nemours, Inc.; maleic anhydride modified polyolefins and copolymers of polyolefins such as that commercially available under the trade designation MODIC™ from Mitsubishi Chemical Co.; polyolefins containing homogeneously dispersed vinyl polymers such as those commercially available under the trade designation VMX™ from Mitsubishi Chemical Co. (e.g., FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%); POLYBOND™ (believed to be a polyolefin grafted with acrylic acid) from B.P. Chemicals Inc.; PLEXAR™ (believed to be a polyolefin grafted with functional groups) from Quantum Chemicals, Inc.; a copolymer of ethylene and acrylic acid such as that commercially available under the trade designation PRIMACOR™ from Dow Chemical Co.; a copolymer of ethylene and methacrylic acid such as that commercially available under the trade designation NUCREL™ from E.I. DuPont de Nemours, Inc.; a copolymer of ethylene and methyl acrylate such as those available from Eastman Chemicals, Inc.; a terpolymer containing ethylene, glycidyl methacrylate, methyl methacrylate such as that available under the trade designation LOTADER™ AX 8900 from Elf Atochem North America;; and thermoplastic polyurethanes such as that available under the trade designation MORTHANE™ PN09-200 from Morton Chemicals, Inc.

The blend of polyolefin and hydrocarbon resin can be combined with various adjuvants including fillers, dyes, pigments, nucleating agents, plasticizers, antioxidants, flame retardants, UV stabilizers or absorbers, heat stabilizers, and processing aids such as extrusion aids and lubricants. For example, clays, hydrated silicas, calcium silicates, silicoaluminates, and fine furnace and thermal blacks can be added to increase cohesive strength and stiffness. Platy pigments and fillers, such as mica, graphite, and talc, can be added to increase acid and chemical resistance and reduce gas permeability. Various adjuvants can be added to impart or modify properties such as ink-receptivity, sewability, launderability, and weldability using, e.g., RF, HF, thermal or ultrasonic energy. Pigments, fillers and dyes can also be used to modify optical properties of the blend such as color, opacity and gloss. Other fillers can include glass or polymeric beads or bubbles, metal particles, fibers, and the like. Typically, pigments and fillers will be used in amounts of about 0.1% to about 50% by weight, based on the total weight of the blend. Likewise, adjuvants can be added to any additional layers employed in the retroreflective articles of the invention.

Crosslinkers such as multifunctional acrylates, benzophenone, derivatives of benzophenone, and substituted benzophenones such as acryloyloxybenzophenone can be added to some blends used in the invention, and can be used to improve properties of the blend such as solvent resistance, affine deformation characteristics or tensile modulus. Such crosslinkers are preferably not thermally activated, but instead are activated by a source of electromagnetic radiation such as ultraviolet light or electron-beam radiation. If a crosslinker is employed, it typically will be added in an amount of about 0.01% to about 5.0% by weight, based on the total weight of the blend. Crosslinkers can also be added to any additional layers employed in the retroreflective articles of the invention.

Flame retardants can be added to improve resistance to flame initiation or flame propagation. Examples include brominated aromatic compounds such as decabromodiphenyloxide; antimony compounds such as antimony trioxide or antimony pentoxide, aluminum trihydrate; the flame retardants described in WO 99/28128; and the flame retardant polyethylene concentrate commercially available under the trade designation PE concentrate 1 Nat-2P-W from M.A. Hanna Corp., which contains a flame retardant blend of a brominated imide, antimony trioxide and polyethylene polymer. If employed, flame retardants typically will be added in amounts of about 1% to about 50% by weight, based on the total weight of the blend. Flame retardants can also be added to any additional layers employed in the retroreflective articles of the invention.

Antioxidants, ultraviolet absorbers (UVAs) or stabilizers can be used to improve processing or to protect against environmental aging caused by UV light or heat. Suitable antioxidants include hindered phenols and hindered phosphites. Suitable UVAs include benzophenones, benzotriazoles and benzoxazinones. Suitable stabilizers include radical scavengers (e.g., hindered amines and hindered benzoates) and hydroperoxide decomposers (e.g., hindered amines and phosphates). Typically, antioxidants, UVAs and stabilizers are used in amounts of about 0.1% to about 5.0% by weight, based on the total weight of the blend. Antioxidants, UVAs and stabilizers can also be added to any additional layers employed in the retroreflective articles of the invention.

Blending of the polyolefin and hydrocarbon resin and any optional adjuvants can be performed using any method that results in a substantially homogenous distribution of the ingredients. Suitable methods include melt blending, solvent blending, physical mixing and coextrusion. Suitable blending equipment is readily available and will be familiar to those skilled in the art.

Films can be made from the blend using a variety of types of equipment and a number of melt-processing techniques (typically, extrusion techniques) well known in the art. Such equipment and techniques are disclosed, for example, in U.S. Pat. Nos. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, spinnerets, full moon feedblocks (such as those described in U.S. Pat. No. 5,389,324 to Lewis et al.), or other types of melt processing equipment can be used, depending on the number of layers desired and the types of materials extruded. Layer multipliers in which a film is split into a plurality of individual subfilms that are then stacked one upon another to increase the number of layers in the ultimate film can also be used.

Tie layers can be used if desired to enhance adhesion between layers in multilayer retroreflective articles of the invention. Materials useful in the tie layers include, but are not limited to, the various additional layer materials mentioned above.

The films can be cast or extruded (optionally with the assistance of solvents) onto a suitable collector and used as is. If desired, the films can be further processed, using, e.g., calendaring, surface treatments, subsequent coating steps, or other processing techniques that will be familiar to those skilled in the art. For some applications, the films preferably are oriented (e.g., stretched) before use in order to alter the mechanical properties of the resulting film. Suitable orientation equipment is readily available and will be familiar to those skilled in the art. Uniaxial or biaxial orientation can be performed, using one or more stretching steps and one or more stretching temperatures. For machine stretching, orientation preferably is carried out at a temperature or temperatures between the Tg and Tm of the blend, by stretching the film using suitable lengthwise or cross-direction stretching devices. These devices can be operated sequentially or simultaneously. For blown films, orientation preferably is carried out a temperature or temperatures near or above the Tm of the blend, by blowing a tube of the film to increase the diameter of the tube.

The films can optionally be heat-treated at a selected temperature (typically below the melting point of the blend) following the orienting step or steps, in order to provide improved dimensional stability. Any suitable heat treatment and heat treatment method can be used. Preferably the article is restrained during the heat treatment. For example, the film can be passed through a heated chamber after being oriented.

Generally the films have a thickness of about 25 μm to about 500 μm. Depending on the desired application, thicknesses less than 25 μm or greater than 500 μm can also be employed.

If desired, one or more functional layers can be applied to the films. For example, an adhesive layer may be applied to at least one of the major surfaces of the film. The adhesive layer can be activated by pressure, heat, electromagnetic energy, solvent or any combination thereof and can have a variety of chemical compositions. Suitable adhesives can be based, for example, on a poly(α olefin), block copolymer, acrylate, rubber/resin, or silicone. The adhesive can be applied at conventional coating weights (e.g., 0.0001 to 0.02 g/cm$^2$) using any conventional coating device such as a rotary rod die, slot die or a gravure roll. Other functional layers can also be employed. Thus, for example, an ink-receptive layer, abrasive layer, retroreflective or other light management layer, light sensitive layer, release layer or other functional layers can be employed. The films can be surface-treated (e.g., with a chemical primer coating, flame treatment, corona discharge treatment, or other surface treatment that will be familiar to those skilled in the art), in order to enhance adhesion of a functional layer thereto.

Other characteristics (e.g., thickness, materials, refractive index, seal pattern and the like) of the retroreflective articles of the invention, if not already mentioned above, will be familiar to those skilled in the art.

The articles of the invention have a variety of uses, including reflective footwear (e.g., athletic shoes), apparel (e.g., outerwear, athletic shorts, T-shirts, sweat suits, etc.), safety wear (e.g., vests, hats, trousers and gloves), sweatbands (e.g., head bands and wrist bands), piping or adornments for any of the foregoing, and the like.

The properties of articles of the invention are further illustrated in the following examples. Unless otherwise indicated, all parts and percentages are by weight.

EXAMPLE 1

Several blends based on mixtures of REXFLEX WL203 polypropylene FPO (Huntsman Corp.) and PICCOLYTE C135 terpene hydrocarbon resin (Hercules Inc.) were compounded using a BRABENDER™ mixing head (C.W. Brabender Instruments, Inc.), at 70%, 60%, 50% or 40% polyolefin content and 30%, 40%, 50% or 60% hydrocarbon resin content. A control composition containing no hydrocarbon resin and the blends were compounded for 3 minutes at 180° C. and a rotor speed of 100 rpm. The compounded control composition and blends were then pressed into films approximately 0.5 to 1 mm thick, using a hydraulic press whose platens had been heated to 180 to 200° C. The pressed films were removed from the heated platens and immediately reinserted between water-cooled platens in a second press and placed under pressure to quench the films. Manual manipulation of the films demonstrated that the films had a vinyl-like feel, and were non-elastomeric, conformable and drapable. Blends containing 30% or 40% hydrocarbon resin were also affinely deformable by hand. Although the films were dead-stretchable by hand at low elongation rates, they were tearable by hand at high elongation rates. These characteristics closely mimicked typical plasticized PVC films.

The dynamic mechanical properties of the films were measured 7 to 10 days later using a RHEOMETRICS™ Solid Analyzer II at 1 Hz and a nominal strain of 0.1%, using a temperature scan that increased from −60° C. to 80° C. at 3° C./min.

Figure 11:
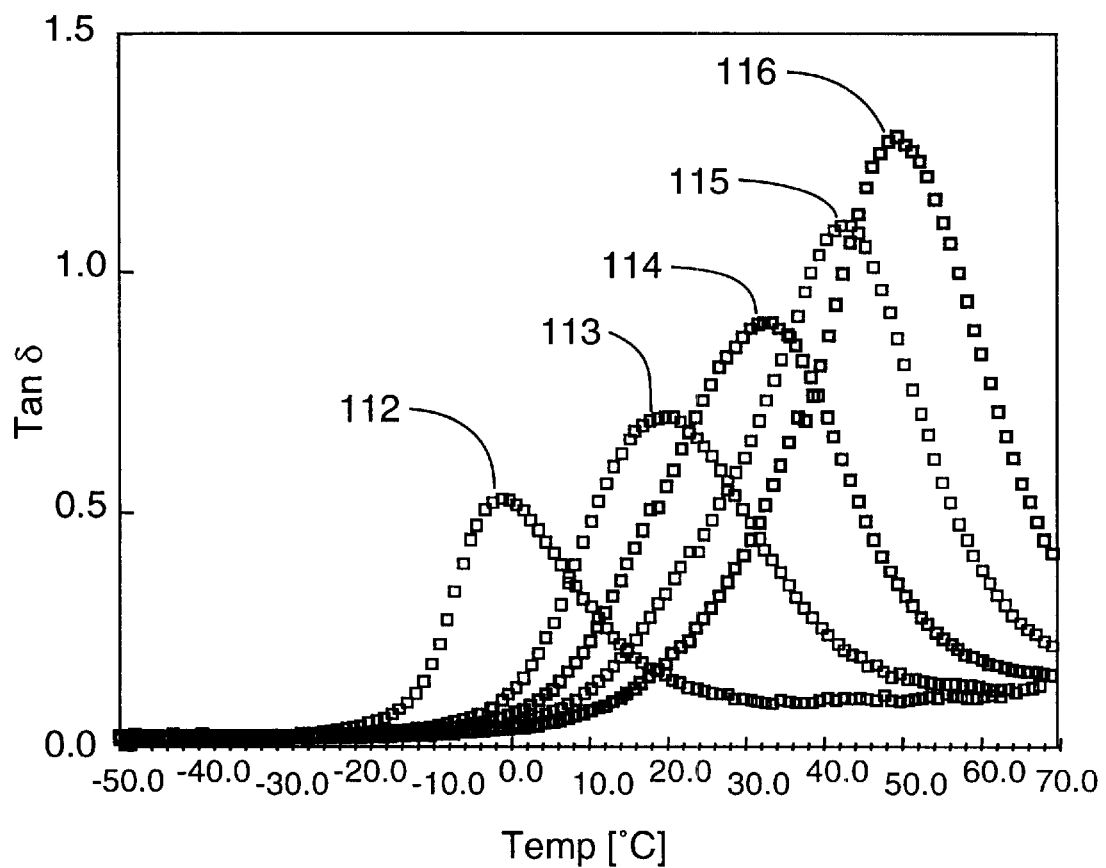
FIG. 11 is a graph illustrating Tan δ vs. temperature for various blends of polyolefin and hydrocarbon resin.
Figure 11A:
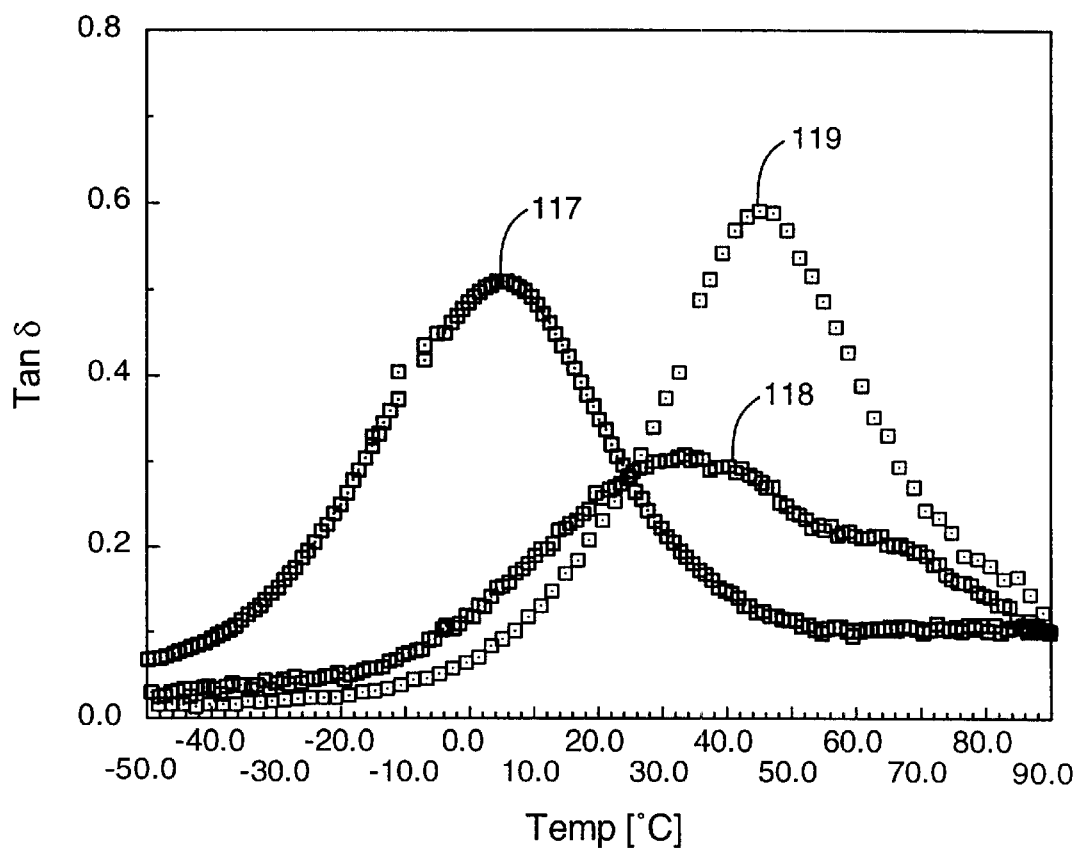
FIG. 11a is a graph illustrating Tan δ vs. temperature for three plasticized PVC resins.

Curves 112, 113, 114, 115 and 116 in FIG. 11 show the resulting dynamic mechanical analysis (DMA) curves illustrating Tan δ vs. temperature for 100% polypropylene (curve 112) and for blends containing 30%, 40%, 50% and 60% hydrocarbon resin (curves 113, 114, 115 and 116, respectively). As hydrocarbon resin content increased, the glass transition temperature (Tg) increased systematically as evidenced by the shifting position of the Tan δ peak. The single Tg of each blend indicates that the blends were compatible and miscible. Curves 117, 118 and 119 in FIG. 11a illustrate Tan δ vs. temperature DMA results for three representative plasticized PVC resins. These resins have differing Tg values that can readily be mimicked by selecting a suitable blend of polyolefin and hydrocarbon resin. This facilitates matching or mimicking the temperature-dependent behavior of PVC films.

Figure 12:
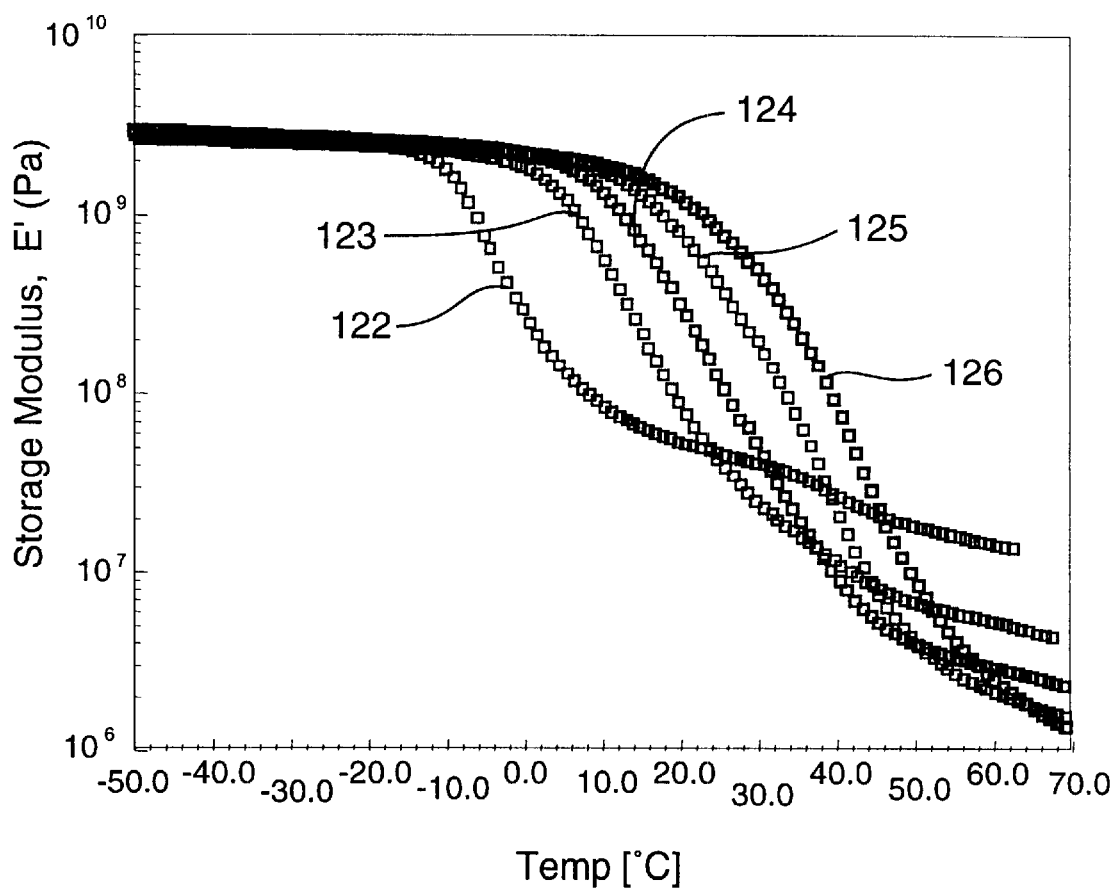
FIG. 12 is a graph illustrating storage modulus vs. temperature for several blends of polyolefin and hydrocarbon resin.
Figure 12A:
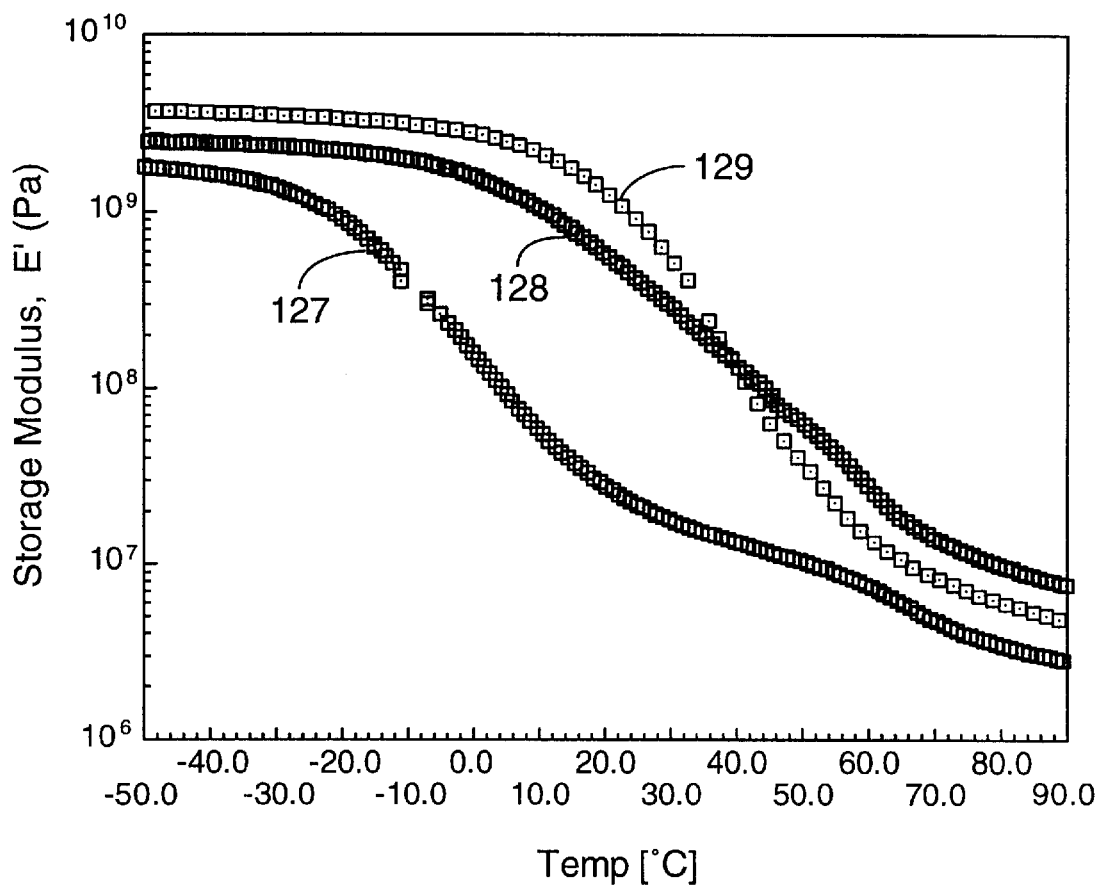
FIG. 12a is a graph illustrating storage modulus vs. temperature for three plasticized PVC resins.

Curves 122, 123, 124, 125 and 126 in FIG. 12 show the storage moduli for 100% polypropylene (curve 122) and for blends containing 30%, 40%, 50% and 60% hydrocarbon resin (curves 123, 124, 125 and 126, respectively). Curves 127, 128 and 129 in FIG. 12a illustrate storage moduli for three representative plasticized PVC resins. As shown in FIG. 12, increasing the proportion of hydrocarbon resin caused the room temperature storage modulus of the blend to increase as well. This facilitates matching or mimicking the storage modulus behavior and "hand" of PVC films. Increasing the proportion of hydrocarbon resin also caused the elevated temperature storage modulus of the blend to decrease (e.g., at 60° C. to 70° C.). As discussed above, this latter effect can aid in the application of films made from these blends to irregular surfaces, because heat can be used to coax (soften) the film into conformability with such a surface. The blend containing 60% hydrocarbon resin actually had better conformability at elevated temperatures than the comparison PVC films shown in curves FIG. 12a.

EXAMPLE 2

Several 3 layer films were fabricated using a 254 mm wide 3 layer CLOEREN™ coextrusion vane die, a water cooled casting roll and downstream wind up facilities. Blends containing 60%, 50% or 40% of REXFLEX WL203 FPO polyolefin and 40%, 50% or 60% of PICCOLYTE C135 terpene hydrocarbon resin were compounded in a 34 mm BERSTORFF™ co-rotating twin screw extruder and fed to the center layer of the die. The two surface layers of the die were fed with ELVAX™ 3134 (DuPont Co.) poly (ethylene-co-vinyl acetate) having 12.0% vinyl acetate content and an 8.0 melt flow index, delivered from two independent single screw extruders. Flow rates from the three extruders were adjusted such that the surface layers were each 15% of the overall film and the center layer was 70% of the overall film. The casting roll was cooled to 23° C. Both 0.08 mm thick and 0.8 mm thick films were cast from each blend. The thicker films were used to prepare biaxially stretched films at a temperature of 75° C. and a stretch rate of 100%/sec. All stretching was done in a simultaneous fashion to prepare films having 2×2, 3×3, 4×4, and 6×6 balanced draw ratios.

Manual manipulation of the films demonstrated that the films had a vinyl-like feel, and were non-elastomeric, conformable, drapable, and affinely deformable by hand. Although the films were dead-stretchable by hand at low elongation rates, they were tearable by hand at high elongation rates. The films had substantially isotropic behavior, that is, their physical properties were essentially the same in each of two orthogonal directions in the plane of the film (in this case, in the two directions of orientation).

Mechanical testing of the thin cast films (0.08 mm) and the biaxially stretched films was performed 7 to 10 days later using a tensile to break test, a stress relaxation test, and a strain recovery test.

Tensile modulus and deformation index were obtained using a tensile to break test, which was performed as follows. Film samples having a width of 12.7 mm were placed in a tensile tester at a gauge length of 50.8 mm. The tensile tester was operated at a crosshead speed of 25.4 mm/min (50%/min) to 1% strain, and then operated at 305 mm/min. (600%/min) until the sample failed. Tensile modulus was recorded as the secant modulus between 0.5% and 1% strain. Deformation index was recorded as the ratio of yield stress to draw stress.

Residual stress and strain recovery were obtained using a stress relaxation test, which was performed as follows. Film samples having a width of 12.7 mm were placed in a tensile tester at a gauge length of 50.8 mm. Two fiducial marks were placed 50.8 mm apart on the sample. The tensile tester was operated at a crosshead speed of 305 mm/min (600%/min) to 100% strain, so that the fiducial marks were 101.6 mm apart. The sample was held at 100% strain for 60 seconds and the residual stress recorded. The sample was removed from the tensile tester and allowed to recover unrestrained on a bench top for 24 hours at room temperature. The new length between the fiducial marks was recorded and the strain recovery calculated as a percentage of the original strain lost as the sample recovered on the bench top.

Figure 13:
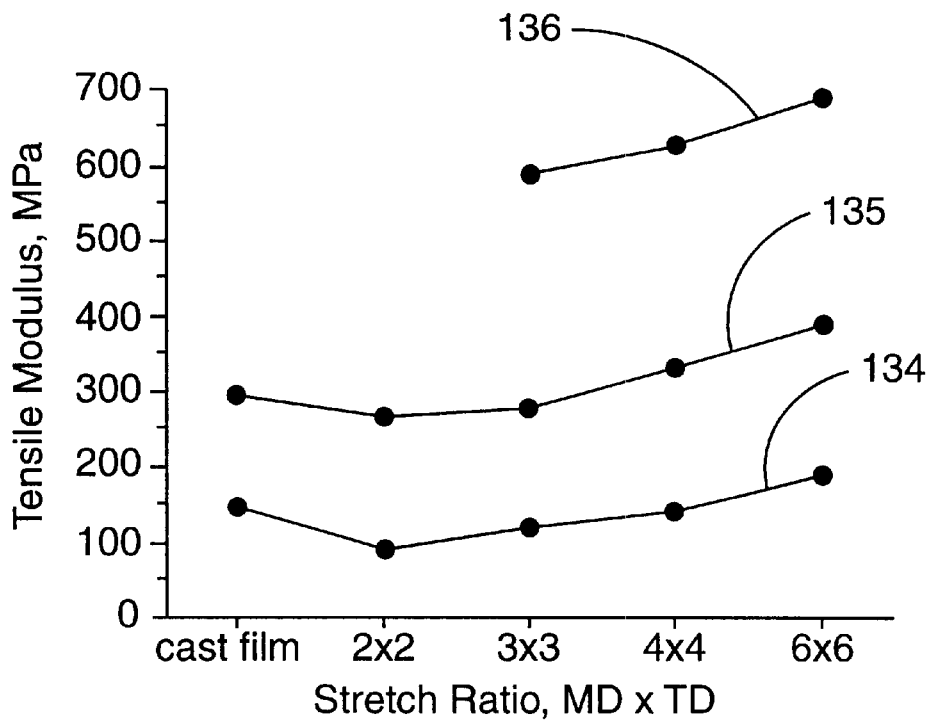
FIG. 13 is a graph illustrating the tensile modulus of several blends of polyolefin and hydrocarbon resin, as cast films or at various biaxial orientation ratios.

Data for the cast films and biaxially stretched films can be seen in FIGS. 13, 14, 15 and 16. FIG. 13 shows the tensile modulus vs. stretch ratio for blends containing 40%, 50% or 60% hydrocarbon resin (curves 134, 135 and 136, respectively). The addition of the hydrocarbon resin to the polyolefin increased the tensile modulus of the blend. Above a sufficiently high orientation ratio (e.g., above a minimum or inflection point that tended to occur at around a 2×2 or 3×3 orientation), increased orientation also increased the tensile modulus of the oriented blend. However, tensile modulus was more heavily influenced by hydrocarbon resin content than by stretch ratio. Tensile modulus values of about 620 to about 700 MPa were obtained from blends containing 60% hydrocarbon resin stretched 4×4 or 6×6. At 60% hydrocarbon resin content, films biaxially stretched at lower stretch ratios tended to be brittle with failures occurring prior to yield. As the biaxial stretch ratio was increased to 3×3 and beyond these films became more ductile and elongations beyond the yield point were realized. Thus although films containing 60% hydrocarbon resin that were cast or biaxially stretched up to 2×2 were brittle, similar films biaxially stretched to 3×3, 4×4, and 6×6 demonstrated elongations at break of 283%, 211% and 163%, respectively.

FIG. 14a shows stress-strain curves 140, 141 and 142 for film samples that were cast (curve 140), or stretched 2×2 (curve 141) or 3×3 (curve 142), respectively, prepared from the blend containing 50% hydrocarbon resin. Curve 140 exhibits non-affine deformation. Curves 141 and 142 in FIG. 14a show progressively greater degrees of affine deformation. As mentioned above, point 143 is the observed yield point for curve 140. Point 146 is the inflection point and deemed yield point for curve 142. The vertical height of point 143 in FIG. 14a shows the yield stress for curve 140, and the vertical height of point 144 shows the draw stress for curve 140. The horizontal extent of point 143 in FIG. 14a shows the yield strain for curve 140, and the horizontal extent of point 145 shows the draw strain for curve 140.

Figure 14:
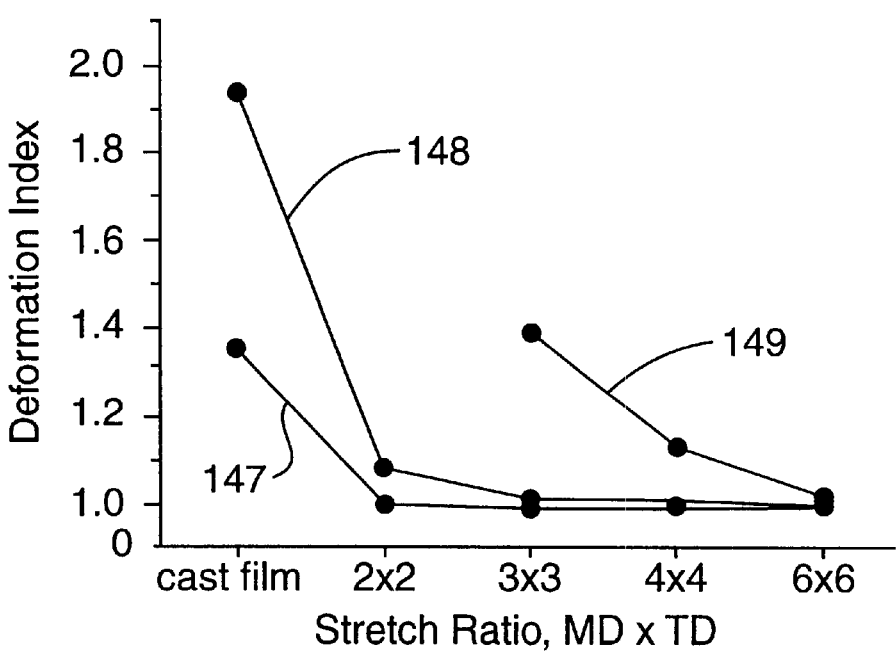
FIG. 14 is a graph illustrating the deformation index of several blends of polyolefin and hydrocarbon resin, as cast films or at various biaxial orientation ratios.
Figure 14A:
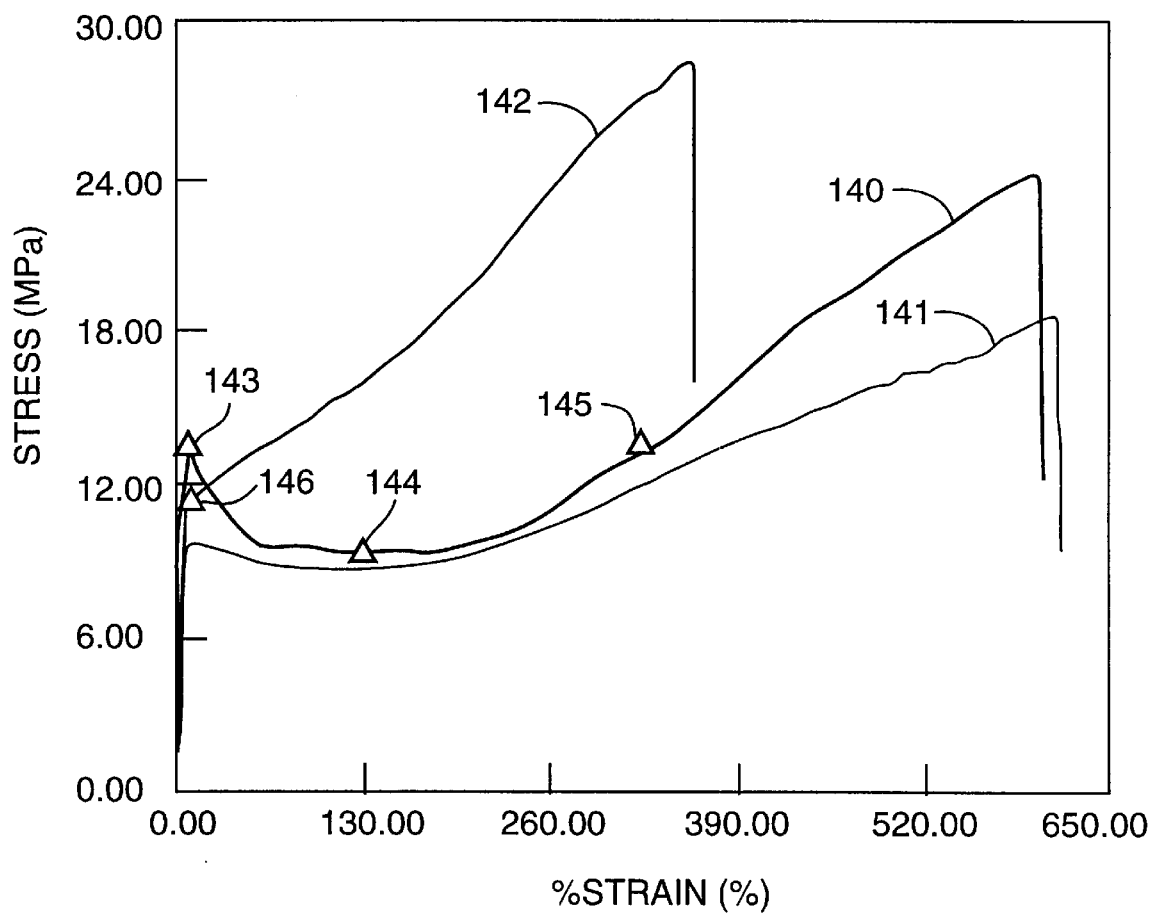
FIG. 14a is a graph illustrating stress-strain curves for films containing a 50:50 blend of polyolefin and hydrocarbon resin, as a cast film and at two biaxial orientation ratios.
Figure 15:
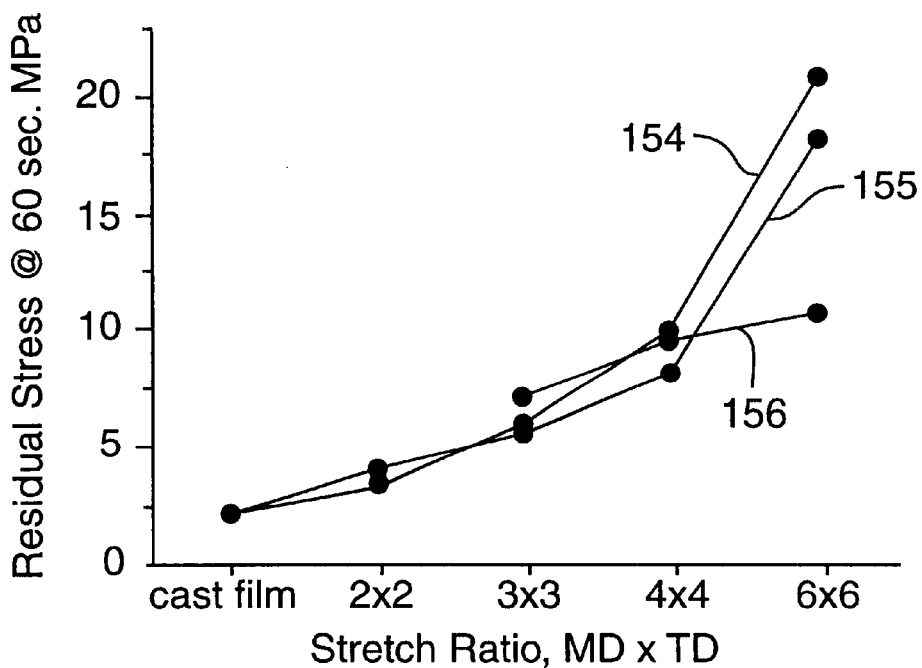
FIG. 15 is a graph illustrating residual stress for several blends of polyolefin and hydrocarbon resin, as cast films or at various biaxial orientation ratios.
Figure 16:
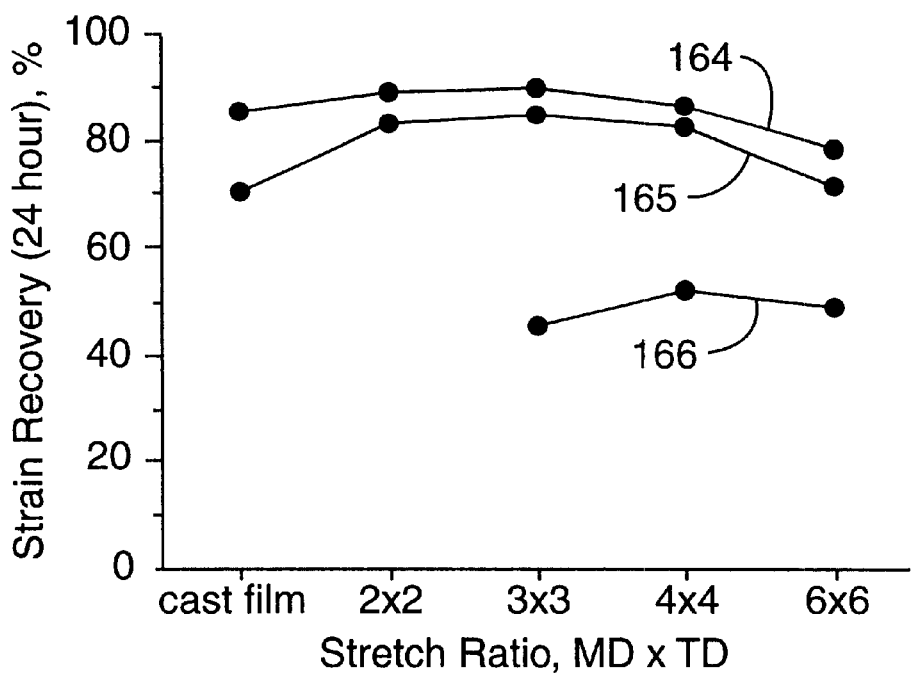
FIG. 16 is a graph illustrating strain recovery for several blends of polyolefin and hydrocarbon resin, as cast films or at various biaxial orientation ratios.

FIG. 14 shows the deformation index vs. stretch ratio for blends containing 40%, 50% or 60% hydrocarbon resin (curves 147, 148 and 149, respectively). The addition of the hydrocarbon resin to the polyolefin tended to cause non-affine deformation in the cast films. But as the biaxial stretch ratio was increased, the deformation index decreased and approached 1.0 (completely affine deformation) at suitably high stretch ratios. Thus the deformation index could be controlled at 1.0 even at the highest hydrocarbon resin contents. These highest hydrocarbon resin content materials are important because they also demonstrated the most dead stretch (conformable) characteristics as is shown in FIG. 15 and FIG. 16. For example, for 60% hydrocarbon resin materials stretched to 6×6, the residual stress was 10.7 MPa and the 24 hour strain recovery was 49% (see curve 156 in FIG. 15 and curve 166 in FIG. 16).

EXAMPLE 3

Figure 17:
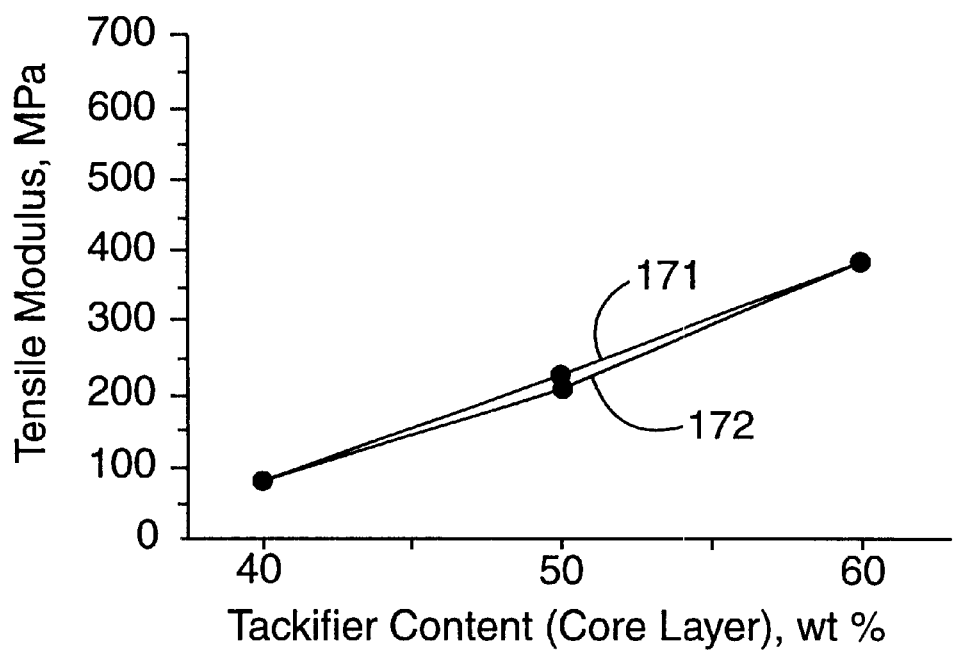
FIG. 17 is a graph illustrating the tensile modulus of several blown films made from blends of polyolefin and hydrocarbon resin, measured in the machine and transverse directions.
Figure 18:
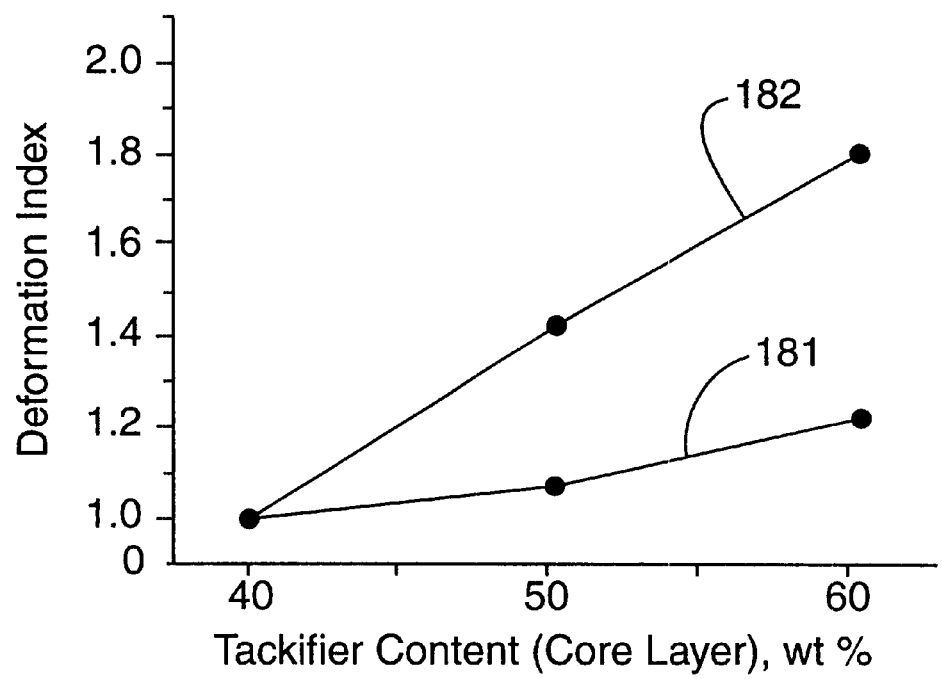
FIG. 18 is a graph illustrating the deformation index of several blown films made from blends of polyolefin and hydrocarbon resin, measured in the machine and transverse directions.
Figure 19:
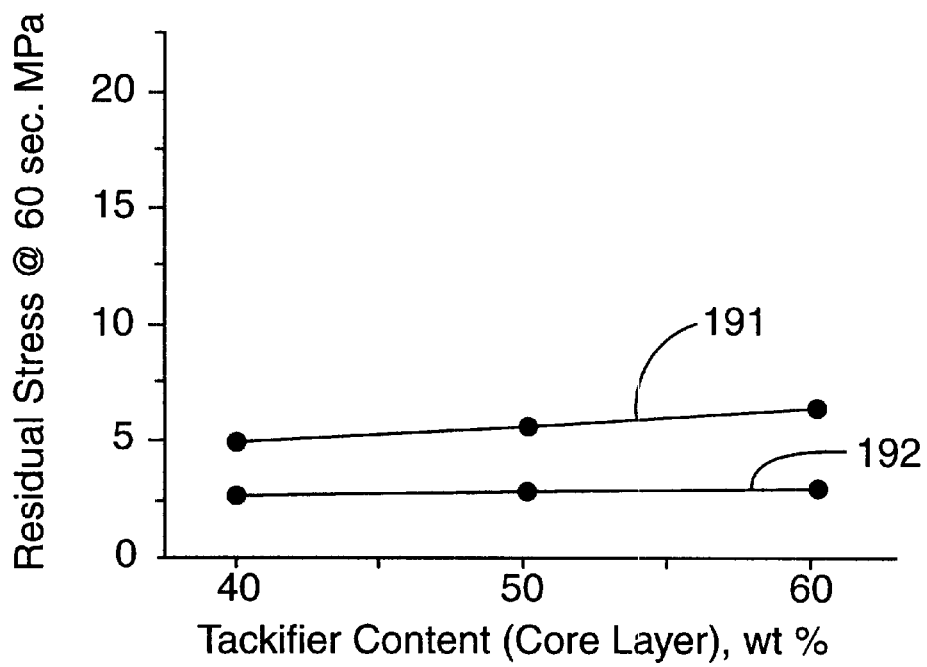
FIG. 19 is a graph illustrating residual stress for several blown films made from blends of polyolefin and hydrocarbon resin, measured in the machine and transverse directions.
Figure 20:
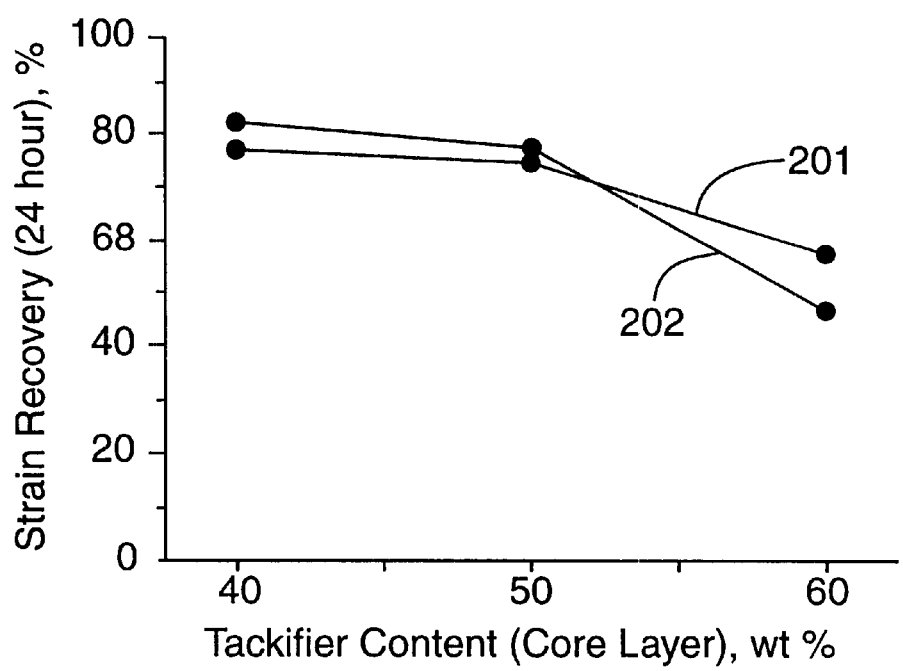
FIG. 20 is a graph illustrating strain recovery for several blown films made from blends of polyolefin and hydrocarbon resin, measured in the machine and transverse directions.

Several 3 layer blown films were fabricated using a three layer annular die with a nominal diameter of about 62 mm. Blends containing 60%, 50% or 40% of REXFLEX WL203 FPO polyolefin and 40%, 50% or 60% of PICCOLYTE C135 terpene hydrocarbon resin were compounded in a BRABENDER conical twin screw extruder and fed to the center layer of the die. The two surface layers of the die were fed with ELVAX™ 3135 (DuPont Co.) poly(ethylene-co-vinyl acetate) having 12.0% vinyl acetate content and a 0.35 melt flow index, delivered from two independent single screw extruders. As in Example 2, flow rates from the three extruders were adjusted such that the surface layers were each 15% of the overall film and the center layer was 70% of the overall film. The take up speed and bubble air pressure were adjusted to give a nominal MD×TD stretch ratio of 8×2 and a final film thickness of approximately 0.1 mm. The mechanical properties of the blown film were evaluated in the machine and transverse directions using the methods described in Example 2. Data for these blown films can be seen in FIGS. 17, 18, 19 and 20. FIG. 17 shows tensile modulus vs. hydrocarbon resin content in the machine direction and transverse direction (curves 171 and 172, respectively). FIG. 18 shows deformation index vs. hydrocarbon resin content in the machine direction and transverse direction (curves 181 and 182, respectively). FIG. 19 shows residual stress vs. hydrocarbon resin content in the machine direction and transverse direction (curves 191 and 192, respectively). FIG. 20 shows strain recovery vs. hydrocarbon resin content in the machine direction and transverse direction (curves 201 and 202, respectively). As was also shown in FIG. 13, FIG. 17 illustrates that tensile modulus was influenced more by hydrocarbon resin content than by stretch ratio. Even though the unbalanced stretch ratio from the blown film process was 8 MD×2 TD, the tensile modulus of the blown films appeared to be the same in both test directions. The orientation delivered via the blowing process may not have been as high as that delivered via the tentering process used in Example 2, since the observed deformation indices were generally higher for the blown films (compare curve 146 in FIG. 14 and curves 181 and 182 in FIG. 18). However, the benefits of increasing orientation in order to lower the deformation index can still be seen in FIG. 18. In FIG. 18, the MD deformation index (curve 181) was lower than the transverse direction deformation index (curve 182). This appears to have been caused by the higher stretch ratio in the machine direction. As was the case for the tentered films of Example 2, the blown films of this Example 3 also exhibited improved dead stretch characteristics (low residual stress and low strain recovery) at higher hydrocarbon resin concentrations (compare FIGS. 15, 16, 19 and 20).

The results in Examples 1 through 3 show that blends containing higher hydrocarbon resin concentrations had increased tensile modulus at room temperature, and decreased tensile modulus at elevated temperatures. This facilitates application of thin films on large substrates, and helps the applicator conform the film to irregularities in the substrate via the use of moderate heat. The results in Examples 2 and 3 also show that higher hydrocarbon resin concentrations decreased both residual stress and strain recovery. These properties enable fabrication of films having "dead stretch" characteristics that are very similar to and in some cases better than plasticized PVC. Such "dead stretch" characteristics allow image-bearing retroreflective articles to be tightly applied using coated adhesives to irregular (contoured) surfaces, and enable the applied article to hold the shape of the underlying irregular surface for the lifetime of the image. Sufficient orientation either via a tentering process or a blown film process also has the beneficial effect of lowering the deformation index and providing more affine deformation. Affine (uniform) deformation helps preserve the appearance of printed images despite application of the retroreflective article to an irregular surface.

EXAMPLE 4

Using the method of Example 2, three 3 layer films were prepared and fabricated into retroreflective articles. The center layer of the die was fed with a blend of 60% REXFLEX WL203 FPO polyolefin and 40% PICCOLYTE C135 terpene hydrocarbon resin that had been compounded in a LEISTRITZ™ 34-mm co-rotating twin screw extruder. One of the outer layers of the die was fed with SURLYN™ 1705-1 zinc ionomer of ethylene methacrylic acid copolymer delivered from a single screw extruder. This layer formed a high gloss, solvent resistant and abrasion resistant layer in the final film construction. The other outer layer of the die was fed with BYNEL™ 3101 acrylate-modified ethylene vinyl acetate copolymer having a 18% vinyl acetate content delivered from a second single screw extruder. This layer formed a receptor layer to which would be applied a layer of acrylate-based retroreflective cube corner elements. Flow rates from the three extruders were adjusted such that the high gloss layer was 10%, the core layer was 70% and the receptor layer was 20% of the resulting film. The other two films were prepared in a similar fashion, using BYNEL 3860 anhydride-modified ethylene vinyl acetate copolymer or MORTHANE PN09-200 thermoplastic polyurethane in the receptor layer in place of BYNEL 3101 copolymer. The receptor layers of all three films were corona-treated to facilitate adhesion of the cube-corner retroreflective elements. The completed retroreflective articles were like those shown in FIG. 5.

Figure 21:
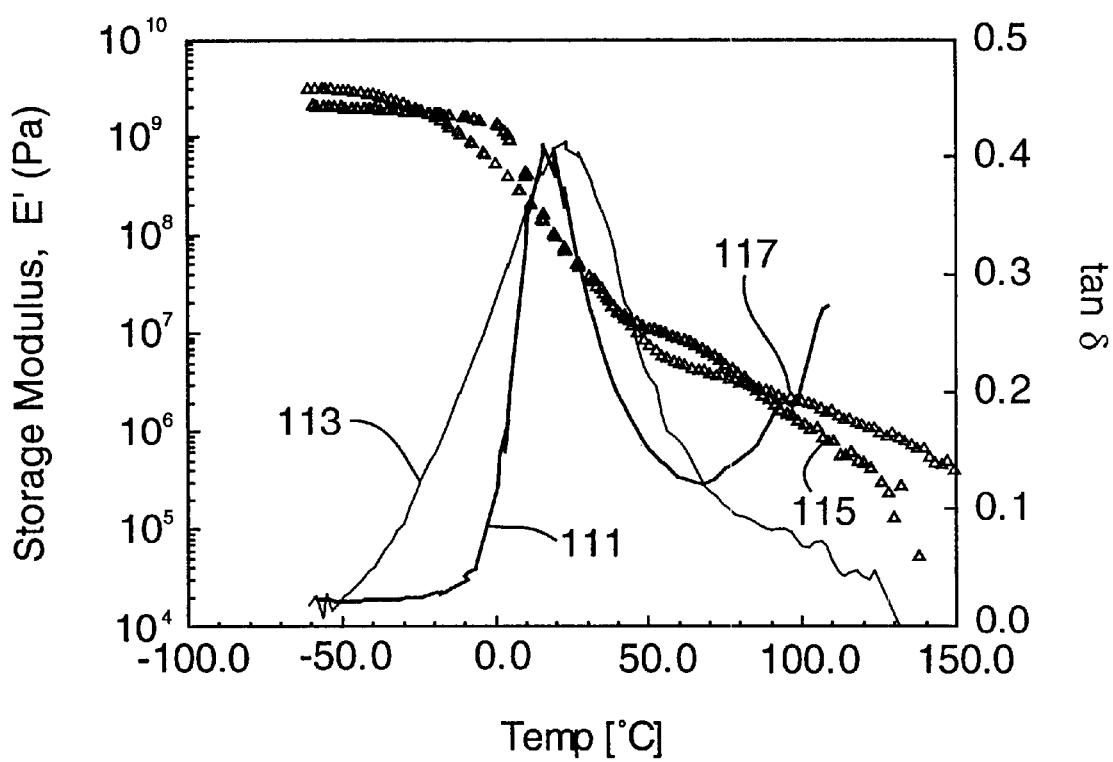
FIG. 21 is a graph illustrating Tan δ vs. temperature and storage modulus vs. temperature for a blend of polyolefin and hydrocarbon resin and for plasticized PVC.

FIG. 21 shows dynamic mechanical analysis curves illustrating Tan δ vs. temperature for the multilayer films of the invention and for plasticized PVC. All three multilayer films had similar dynamic analysis curves, shown as curve 211 in FIG. 21. Plasticized PVC is shown as curve 213 in FIG. 21. FIG. 21 also shows storage modulus vs. temperature curves for the multilayer film and for plasticized PVC (curves 215 and 217, respectively). The multilayer film closely matched the mechanical properties of the plasticized PVC film.

EXAMPLE 5

Using the method of Example 4, several 3 layer films were prepared for use in retroreflective articles. The films had a core layer containing a blend of 80% REXFLEX WL203 FPO polyolefin and 20% PICCOLYTE C135 terpene hydrocarbon resin, and a gloss layer made from SURLYN 1705-1 ethylene/(meth)acrylic acid copolymer. In all instances the extruders were adjusted so that the receptor layer represented 10% of the film. The extruders were adjusted so that in most instances the core represented 70% of the film. However, for Film 5-2, the extruders were adjusted so that the core represented 50% of the film. Set out below in Table I are the film number and the amounts and types of materials employed in the receptor layer for each film.

TABLE I

| Film No. | Receptor Layer |
|---|---|
| 5-1 | 20% BYNEL 3101 acrylate-modified ethylene vinyl acetate |
| 5-2 | 40% BYNEL 3101 acrylate-modified ethylene vinyl acetate |
| 5-3 | 20% BYNEL 2014 acid-modified ethylene acrylate |
| 5-4 | 20% BYNEL 2002 acid-modified ethylene acrylate |
| 5-5 | 20% ELVAX 3165 ethylene vinyl acetate |
| 5-6 | 20% BYNEL 22E695 amine-modified acid copolymer |
| 5-7 | 20% NUCREL 0403 ethylene/methacrylic acid copolymer |

The films felt like plasticized PVC.

EXAMPLE 6

Using the method of Example 5, films were prepared for use in retroreflective articles. The films had a core made from 90% or 80% REXFLEX WL 203 FPO polyolefin, blended with 10% or 20% REGALITE™ V3120 partially hydrogenated hydrocarbon resin. The films each contained 10% of a gloss layer made from SURLYN 1705-1 ethylene/(meth)acrylic acid copolymer. Set out below in Table II are the film number and the amounts and types of materials employed in the receptor layer and core layer for each film.

TABLE II

| Film No. | Receptor Layer | Core Layer |
|---|---|---|
| 6-1 | 30% BYNEL 3101 modified EVA | 60% 20/80 REGALITE V3120/REXFLEX WL 203 |
| 6-2 | 20% BYNEL 3101 modified EVA | 60% 20/80 REGALITE V3120/REXFLEX WL 203 |
| 6-3 | 20% BYNEL 2014 acid-modified ethylene acrylate | 60% 20/80 REGALITE V3120/REXFLEX WL 203 |

The films felt like plasticized PVC.

EXAMPLE 7

Using the method of Example 4, a 3 layer film containing a fluorescent dye in the core layer was prepared for use in a retroreflective article. The dye was protected from degradation and discouraged from migration by the outer layers of the film. HOSTASOL™ Yellow 3G fluorescent dye (Clariant Corp.) was added to the core material blend at the extruder. The resulting film felt like plasticized PVC.

EXAMPLE 8

Using the method of Example 1, film samples containing a 60:40 ratio of polyolefin and hydrocarbon resin were combined with 34.65% titanium dioxide and 0.42% of IRGANOX™ 1010 antioxidant (commercially available from Ciba Specialty Chemicals, Inc.), 0.84% IRGAFOS™ 12 antioxidant (commercially available from Ciba Specialty Chemicals, Inc.), 0.25% TINUVIN™ 328 UV absorber (commercially available from Ciba Specialty Chemicals, Inc.) and 0.25% TINUVIN 770 hindered amine light stabilizer (commercially available from Ciba Specialty Chemicals, Inc.). Films were prepared using three different hydrocarbon resins (PICCOLYTE C135, REGALREZ 1139, or REGALITE T1140) from three different lots of each hydrocarbon resin. Weathering was evaluated using an ATLASTM CI 65A Xenon Arc weatherometer and ASTM. Test Method G26, Method A. Tensile data was collected on all 9 film samples after 500 hours. The strain at break and segment modulus values (measured between 1.5 and 2% strain) showed the following changes, indicating the extent to which embrittlement of the film samples occurred due to weathering. For film samples that contained PICCOLYTE C 135 hydrocarbon resin the average changes in strain at break and segment modulus were −78% and +34%, respectively.

and CHIMASORB™ 2020 (commercially available from Ciba Specialty Chemicals, Inc.). The film samples were evaluated in the weatherometer for 500 hours. The strain at break and segment modulus values showed the following changes, indicating the extent to which embrittlement of the film samples occurred due to weathering. For film samples containing PICCOLYTE C135 resin, the average changes were +25% and +4%. For film samples containing REGALREZ 1139 resin, the average changes were −2% and +1%. For film samples containing REGALITE T1140 resin, the average changes were −42% and −15%.

EXAMPLE 11

Using the method of Example 9, additional film samples containing no hydrocarbon resin, or REGALREZ 1139 or REGALITE T1140 hydrocarbon resin, were prepared using varying amounts of titanium dioxide, the antioxidants IRGANOX 1010 and IRGAFOS 12, the UV absorber TINUVIN 328, and the HALS TINUVIN 770. The run number and amount of each ingredient are set out below in Table III.

TABLE III

| Run No. | Polyolefin | Hydrocarbon Resin | $TiO_2$ | Antioxidant | Antioxidant | UV Absorber | HALS |
|---|---|---|---|---|---|---|---|
| 11-1 | 100% | — | — | — | — | — | — |
| 11-2 | 65% | — | 35% | — | — | — | — |
| 11-3 | 99% | — | — | 0.42%[3] | 0.08%[4] | 0.25%[5] | 0.25%[6] |
| 11-4 | 64.35% | — | 34.65% | 0.42%[3] | 0.08%[4] | 0.25%[5] | 0.25%[6] |
| 11-5 | 63.85% | — | 34.15% | 0.84%[3] | 0.17%[4] | 0.50%[5] | 0.50%[6] |
| 11-6 | 38.28% | 25.4%[1] | 34.32% | 0.84%[3] | 0.17%[4] | 0.50%[5] | 0.50%[6] |
| 11-7 | 38.28% | 25.4%[2] | 34.32% | 0.84%[3] | 0.17%[4] | 0.50%[5] | 0.50%[6] |

[1]REGALREZ 1139
[2]REGALREZ 1140
[3]IRGANOX 1010
[4]IRGAFOS 12
[5]TINUVIN 328
[6]TINUVIN 770

For film samples containing REGALREZ 1139 resin, the average changes were −75% and +18%. For film samples containing REGALITE T1140 resin, the average changes were −12% and +12%.

EXAMPLE 9

Using the method of Example 8, additional film samples containing REGALREZ 1139 or REGALITE T1140 hydrocarbon resin were prepared using 34.32% $TiO_2$, and double the amounts of the antioxidants, UV absorber and HALS used in Example 8. The film samples were evaluated in the weatherometer for 1000 hours. The strain at break and segment modulus values showed the following changes, indicating the extent to which embrittlement of the film samples occurred due to weathering. For film samples containing REGALREZ 1139 resin, the average changes were −73% and +28%. For film samples containing REGALITE 1140 resin, the average changes were −6% and +7%.

EXAMPLE 10

Using the method of Example 9, additional film samples containing PICCOLYTE C135, REGALREZ 1139 or REGALITE T1140 hydrocarbon resin were prepared using 34.32% $TiO_2$, 0.25 each of the antioxidants IRGANOX 1010 and IRGAFOS 168, 0.5% of the UV absorber TINUVIN 328, and 0.25 Wt. % each of the HALS TINUVIN 770

Figure 22:
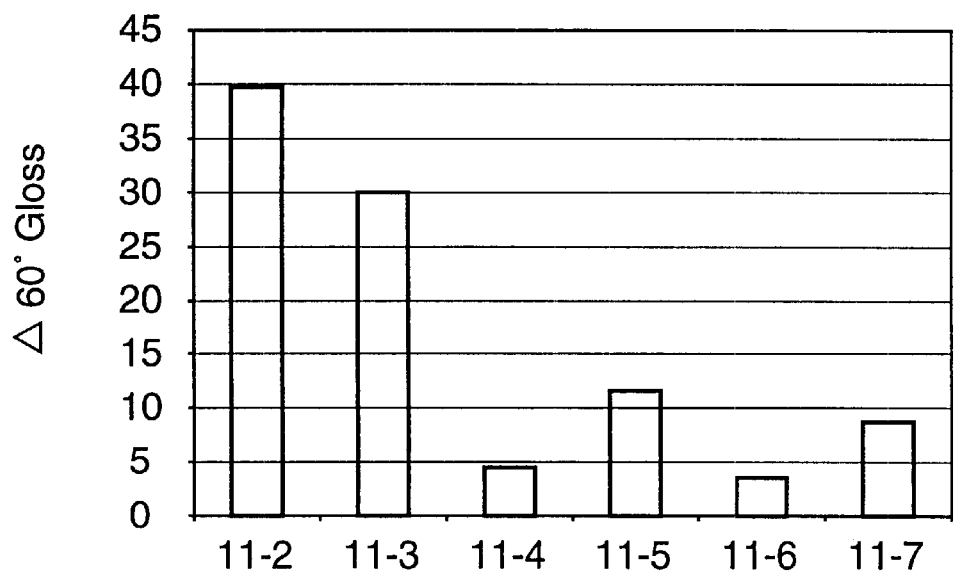
FIG. 22 is a graph illustrating change in 60° gloss after weathering for blends of polyolefin and hydrocarbon resin containing stabilizers.
Figure 23:
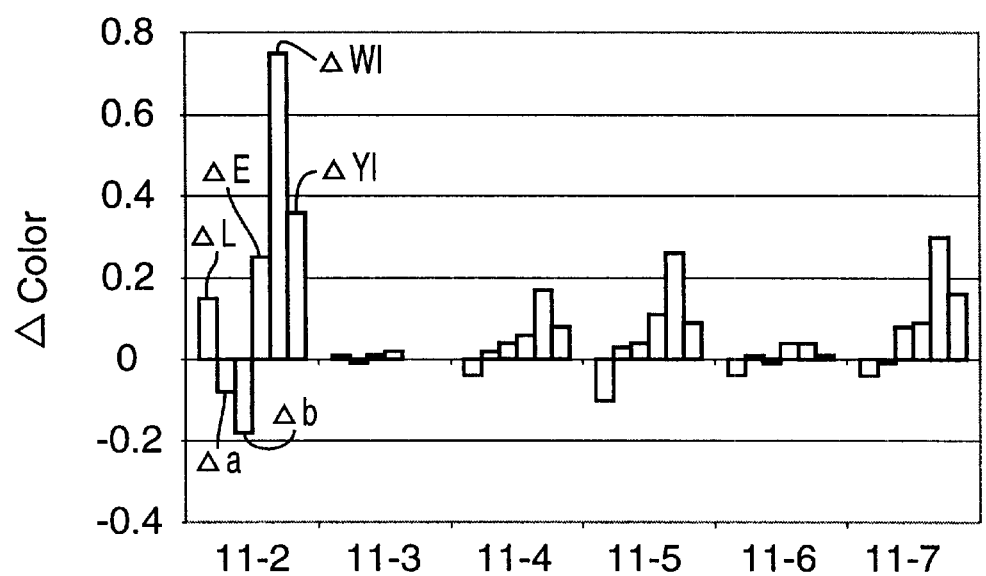
FIG. 23 is a graph illustrating color change after weathering for blends of polyolefin and hydrocarbon resin containing stabilizers.

The film samples of Run Nos. 11-2 through 11-7 were evaluated in the weatherometer for 1000 hours, then evaluated for 60° gloss difference using ASTM D523-89 and a MICRO-TRI-GLOSS™ Model 4520 gloss meter (BYK Gardner Co.), for color difference using ASTM D2244-93, and for yellowness and whiteness index difference using ASTM E313-98. FIG. 22 shows the 60° gloss results, and indicates that Run No. 11-6 provided very good gloss retention. FIG. 23 shows the color test results. The first data bar for each sample in FIG. 23 shows ΔL, which is a measure of whiteness/blackness shift. The second data bar shows Δa, which is a measure of green/red shift. The third data bar shows Δb, which is a measure of blue/yellow shift. The fourth data bar shows ΔE, which is a calculated from ΔL, Δa and Δb. The fifth data bar shows ΔWI, which is a measure of whiteness index shift, and the sixth data bar ΔYI, which is a measure of the yellowness index shift. Run No. 11-3 was not evaluated for ΔWI or ΔYI. As shown in FIG. 23, Run No. 11-6 provided particularly good color stability.

EXAMPLE 12

Using the method of Examples 2 and 4, a 3-layer film was fabricated and biaxially oriented at a 6×6 ratio by simultaneous stretching. The core layer of the film contained a blend of 40% REXFLEX WL203 FPO polyolefin and 60% PICCOLYTE C135 terpene hydrocarbon resin. The skin layers of the film (which each represented 15% of the overall film construction) contained ELVAX™ 3134 poly(ethylene-covinyl acetate). The resulting clear film was laminated to an acrylic pressure sensitive adhesive that had been precoated on a release liner.

An unimaged sample of the film was tested for conformability by applying a 25.4 mm wide strip of the film to an acrylic painted metal panel having three depressed channels in its surface. The channels were sized so that when the film was bridged across the channels and then stretched down into the channels, the applied film would be elongated by 10%, 15%, and 25% respectively. The unimaged film was stretched into these channels at room temperature using finger pressure. It deformed easily into the channels without breaking. The applied film was examined after four days and showed no signs of lifting out of the channels.

An electrostatically printed image was transferred from a transfer paper to a sample of the clear film using a hot roll laminator. A 25.4 mm wide strip of the imaged film was applied to the channeled panel at room temperature using finger pressure. The imaged film deformed easily into the channels without breaking and without severe distortion of the image. The imaged film application was repeated by heating the film and panel for one minute at 66° C. after the film had been bridged over the channels. The heated film deformed easily into the channels without breaking and without severe distortion of the image. The applied film was examined after four days and showed no signs of lifting out of the channels.

A sample of the imaged film was also applied to a plastic panel that had a 15-mm deep rounded contour molded into the face of the panel. The film was applied to the panel by bridging the film over the contour, and then stretching the film down into the contour using finger pressure and a heat gun. The imaged film deformed easily and stretched down into the contour without breaking and without severe distortion of the image. The applied film was examined after four days and showed no signs of lifting out of the contour.

EXAMPLE 13

Using the method of Example 4, a series of three different 4-layer films was prepared by co-extrusion and used to fabricate a retroreflective article. The core layer of each film was formed by dissolving 0.25% each of CYTEC™ UV531 and CYTEC™ UV 3346 ultraviolet stabilizers in a hydrocarbon resin, melting the resulting mixture and metering separate streams of the molten mixture and a polyolefin to a 34-mm LEISTRITZ™ co-rotating twin screw extruder equipped with a pelletizer. The pellets were fed to a second twin screw extruder and into the second layer of a 4-layer die. A single screw extruder was used to deliver two split streams containing BYNEL™ 3101 copolymer and 0.25% each of CYTEC UV531 and CYTEC UV3346 ultraviolet stabilizers to the first and third layers of the die. The first layer formed a receptor layer in the finished film, and the third layer formed a tie layer between the core layer and a gloss layer. The gloss layer was formed by delivering SURLYN™ 1705-1 copolymer and 0.25% each of CYTEC UV531 and CYTEC UV 3336 ultraviolet absorbers from a further single screw extruder. The flow rates were adjusted so that the receptor, core, tie and gloss layers represented 20%, 60%, 10% and 10%, respectively, of the total film construction.

In addition to the ultraviolet stabilizers mentioned above, the three different 4-layer films contained the core materials shown below in Table IV:

TABLE IV

| Film No. | Core Layer Ingredients |
| --- | --- |
| 13-1 | 55% EXACT ™ 3024 polyolefin[1] |
|  | 15% EXACT ™ 4033 polyolefin[1] |
|  | 30% REGALITE ™ V3120 resin[2] |
| 13-2 | 80% ADFLEX ™ KS 359P polyolefin[3] |
|  | 20% REGALITE ™ V3120 resin[2] |
| 13-2 | 50% EXACT ™ 3035 polyolefin[1] |
|  | 20% EASTMAN ™ SP 1305 polyolefin[4] |
|  | 30% REGALITE ™ V3120 resin[2] |
|  | 0.1 wt % HOSTASOL 3G fluorescent dye[5] |

[1]Exxon Chemicals, Inc.
[2]Hercules, Inc.
[3]Basell Polyolefins
[4]Eastman Chemicals Inc.
[5]Clariant Corporation; dissolved in the resin and then metered into the twin screw extruder.

Two films having overall calipers of 0.25 mm and 0.18 mm were prepared from Film No. 13-2 by varying the line speed. The proportional layer thicknesses remained the same for these two films. The receptor layer surfaces of all of the films were corona-treated prior to casting an acrylate syrup on the corona-treated surfaces to form a layer of cube-corner retroreflective elements.

EXAMPLE 14

Using the method of Example 3, several 3-layer blown films having clear, white or black core layers were fabricated using blown film processing techniques. These 3-layer films can be used as replacements for plasticized PVC films used in various retroreflective articles. Film conformability is important for ensuring long-term intimate adhesion of the film to the irregular or compound curved surfaces typically found on vehicles. Without sufficient conformability, the stresses set up in the films during application can cause the film to pull away from the vehicle surface and undergo undesirable effects such as edge lifting. In addition, the film preferably should have an appropriate tensile modulus so that the film is sufficiently self-supporting to facilitate handling during film application.

The clear films and the white film had a finished thickness of 0.06 mm, and the black film had a finished thickness of 0.10 mm. In each case the core layer was 70% of the overall film construction and the two surface layers were each 15% of the overall film construction. The core layer provided conformability and mechanical properties mimicking plasticized PVC, and served as the carrier for pigments (if present). The surface layer on the outside of the blown bubble construction provided a receptor layer for a subsequently-applied layer of pressure sensitive adhesive (PSA). The surface layer on the inside of the blown bubble provided a receptor layer for subsequently-applied retroreflective elements, inks or clear coats. All blends for the core layer and surface layers were compounded and pelletized prior to extrusion of the blown film. The white core layer of sample 14-6 was compounded in a BUSS KNEADER™ reciprocating extruder. The remaining film layers were compounded in a 40 mm BERSTORFF™ co-rotating twin-screw extruder having a 26:1 length to diameter ratio.

The films were extruded through a nominal 101.6 mm diameter annular blown film die fed by three single-screw extruders set up to deliver the core layer and surface layer blends. The pressures and temperatures were rates were adjusted to provide a 15% outer surface layer/70% core layer /15% inner surface layer construction. The bubble take up speed and bubble pressure were adjusted to give nominal MD×TD orientation ratios of either 9×3 or 5.5×3. Set out below in Table V are the run number, composition of each layer, overall film thickness and film orientation ratios for each film.

TABLE V

| Film Number | Film Type | Core Layer (70 wt %) | Outer Receptor Layer (15 wt %) | Inner Receptor Layer (15 wt %) | Film Thickness (mm) |
|---|---|---|---|---|---|
| 14-1 | clear | 74.7% NUCREL 1202HC[1]<br>24.9% REGALITE T-1140[2]<br>0.4% CHIMASSORB 944[3] | 72.0% BYNEL 3101[4]<br>24.0% MACROMELT 6239[5]<br>4.0% UV10407[6] | 68.3% BYNEL 3101<br>19.2% ELVALOY 741[7]<br>3.5% UV10407<br>7.0% ABC-5000[8] | 0.06 |
| 14-2 | clear | 74.7% NUCREL 1202HC<br>24.9% REGALITE T-1140<br>0.4% CHIMASSORB 944 | 72.0% BYNEL 3101<br>24.0% MACROMELT 6239<br>4.0% UV10407 | 52.5% BYNEL 3101<br>35.0% ELVALOY 741<br>3.5% UV10407<br>7.0% ABC-5000 | 0.06 |
| 14-3 | Clear | 74.7% NUCREL 1202HC<br>24.9% REGALITE T-1140<br>0.4% CHIMASSORB 944 | 72.0% BYNEL 3101<br>24.0% MACROMELT 6239<br>4.0% UV10407 | 74.3% NUCREL 1202HC<br>9.2% MACROMELT 6239<br>3.7% UV10407<br>4.6% ABC-5000 | 0.06 |
| 14-4 | Black | 67.4% NUCREL 1202HC<br>24.2% REGALITE T-1140<br>8.0% BLACK PEC[9]<br>0.4% CHIMASSORB 944 | 72.0% BYNEL 3101<br>24.0% MACROMELT 6239<br>4.0% UV10407 | 68.3% BYNEL 3101<br>19.2% ELVALOY 741<br>3.5% UV10407<br>7.0% ABC-5000 | 0.10 |
| 14-5 | Black | 67.4% SURLYN 1705-1[10]<br>24.2% REGALITE T-1140<br>8.0% BLACK PEC<br>0.4% CHIMASSORB 944 | 72.0% BYNEL 3101<br>24.0% MACROMELT 6239<br>4.0% UV10407 | 68.3% BYNEL 3101<br>19.2% ELVALOY 741<br>3.5% UV10407<br>7.0% ABC-5000 | 0.10 |
| 14-6 | White | 55.9% SURLYN 1705-1<br>18.7% REGALITE T-1140<br>25.0% TI-PURE R105[11]<br>0.4% CHIMASSORB 944 | 72.0% BYNEL 3101<br>24.0% MACROMELT 6239<br>4.0% UV10407 | 74.3% NUCREL 1202HC<br>9.2% MACROMELT 6239<br>3.7% UV10407<br>4.6% ABC-5000 | 0.06 |

[1]Poly(ethylene co-methacrylic acid), Dupont Packaging
[2]Hydrocarbon resin, Hercules Resins
[3]Hindered amine light stabilizer, Ciba Specialty Chemicals
[4]Acid/acrylate modified poly(ethylene co-vinyl acetate), Dupont Packaging
[5]Polyamide resin, Henkel
[6]Light stabilizer concentrate, Ampecet Corp.
[7]Carbon monoxide modified poly(ethylene co-vinyl acetate), E. I. duPont de Nemours and Co.
[8]Anti-blocking agent, Polyfil Corp.
[9]Carbon black concentrate, PolyOne Corp.
[10]Ionomer based on poly(ethylene co-methacrylic acid), Dupont Packaging
[11]$TiO_2$ pigment, E. I. duPont de Nemours and Co.

A number of performance characteristics were evaluated for each film sample. Two plasticized PVC films (referred to as films "PVC-1" and "PVC-2") currently used in automotive applications and having respective film thicknesses of 0.05 mm and 0.09 mm were similarly evaluated. Young's modulus and elongation to break were measured using a tensile to break test similar to that used in Example 2. However, the tensile tester was operated at a reduced crosshead speed of 152.4 mm/min. (300%/min. instead of 600%/min.) after 1% strain and until the sample failed. Residual stress was measured using a stress relaxation test similar to that used in Example 2. However, the film samples were stress relaxed after an elongation of 10% instead of 100%, and a crosshead speed of 152.4 mm/min. was employed instead of 305 mm/min.

Set out below in Table VI are the run number, film thickness, Young's modulus, elongation at break, and residual stress for each material.

TABLE VI

| | | Tensile Test | | | | Stress |  |
|---|---|---|---|---|---|---|---|
| | | Young's Modulus (MPa) | | Break Elongation (%) | | Relaxation Residual Stress (MPa) | |
| Run No. | Film Thickness | MD | TD | MD | TD | MD | TD |
| 14-1 | 2.4 | 268 | 274 | 373 | 364 | 4.69 | 4.18 |
| 14-2 | 2.4 | 248 | 281 | 338 | 385 | 4.50 | 4.15 |
| 14-3 | 2.4 | 260 | 237 | 300 | 371 | 5.73 | 5.65 |
| 14-4 | 4.0 | 246 | 230 | 422 | 378 | 4.46 | 4.49 |
| 14-5 | 4.0 | 285 | 249 | 362 | 348 | 4.73 | 4.32 |
| 14-6 | 2.4 | 352 | 340 | 212 | 224 | 6.30 | 5.64 |
| PVC-1 | 2.4 | 620 | 620 | 152 | 152 | 7.83 | 7.83 |

TABLE VI-continued

| | | Tensile Test | | | | Stress | |
| | | Young's Modulus (MPa) | | Break Elongation (%) | | Relaxation Residual Stress (MPa) | |
| Run No. | Film Thickness | MD | TD | MD | TD | MD | TD |
| PVC-2 | 4.0 | 756 | 756 | 242 | 242 | — | — |

EXAMPLE 15

A polyolefin (EXACT™ 3024, Exxon Chemical Products) and a hydrocarbon resin (REGALITE™ V3120, Hercules, Inc.) were mixed in selected proportions using a BRABENDER mixing head to formulate individual blends containing 10%, 10%, 30% or 50% hydrocarbon resin. Each blend was then pressed and quenched to form a clear homogenous film between 0.2 and 0.4 mm thick.

Strain recovery was characterized for each of the blends approximately four hours and two days after blend formation. At both the four hour and two day intervals, three 10 mm wide by approximately 150 mm long test strips were cut from each film. Two fiducial lines were drawn on each test strip 50 mm apart. The test strips were mounted into the test grips of a mechanical tensile tester (SINTECH™, MTS Systems Corp.) whose test grips had been set 60 mm apart, so that the fiducial lines were equidistant from the nearest test grip. An elongation of 100% was imparted to each test strip at a crosshead speed of 1000 mm/min. Immediately after elongation, the test strips were removed from the test grips and allowed to relax unrestrained at room temperature. After 5 minutes of relaxation, the distance L between the fiducial marks was recorded. The three test strip measurements for each blend were averaged and the strain recovery was calculated according to formula % Strain Recovery= 100%×(100-L)/50. Set out below in Table VII are the rum number, % polyolefin/%hydrocarbon resin, and the calculated strain recovery values four hours and two days after blend formation.

TABLE VII

| Run No. | % Polyolefin/% Hydrocarbon Resin | Four Hour Strain Recovery, % | Two Day Strain Recovery, % |
| --- | --- | --- | --- |
| 15-1 | 100/0 | 56.7 | 58.0 |
| 15-2 | 90/10 | 72.0 | 58.0 |
| 15-3 | 70/30 | 64.6 | 39.3 |
| 15-4 | 50/50 | 18.7 | 2.7 |

Thus, for these samples, the unoriented films of Run Nos. 15-1through 15-3 initially exhibited more than 50% strain recovery, and the film of Run No. 15-4 initially exhibited less than 50% strain recovery. However, when the films were allowed to age for two days before making physical property measurements, then the films of Run Nos. 15-3 and 15-4 exhibited less than 50% strain recovery. These strain recovery values should drop further following additional aging, albeit at a reduced rate of change.

In Japanese Published Patent Application No. HEI 2000-273250, several unoriented blended films are reported in Table II and several comparison unoriented films are reported in Table III. The time delay, if any, between film formation and physical property measurement was not reported. These reported films are said to have 5 minute "Elastic Recovery" values (calculated using the formula "elastic recovery (%)=((L1-50)/50×100" where L1 is the distance between fiducial indicator lines 5 minutes after release) of from 13.2 to 38.5 in the machine direction and from 13.4 to 39.5 in the transverse direction. Converting these values to strain recovery values using the formula shown above, the reported films of HEI 2000-273250 had strain recovery values of from 61.5 to 86.8 in the machine direction and from 60.5 to 86.6 in the transverse direction. These reported films were thus elastomeric films as defined above.

EXAMPLE 16

Figure 24:
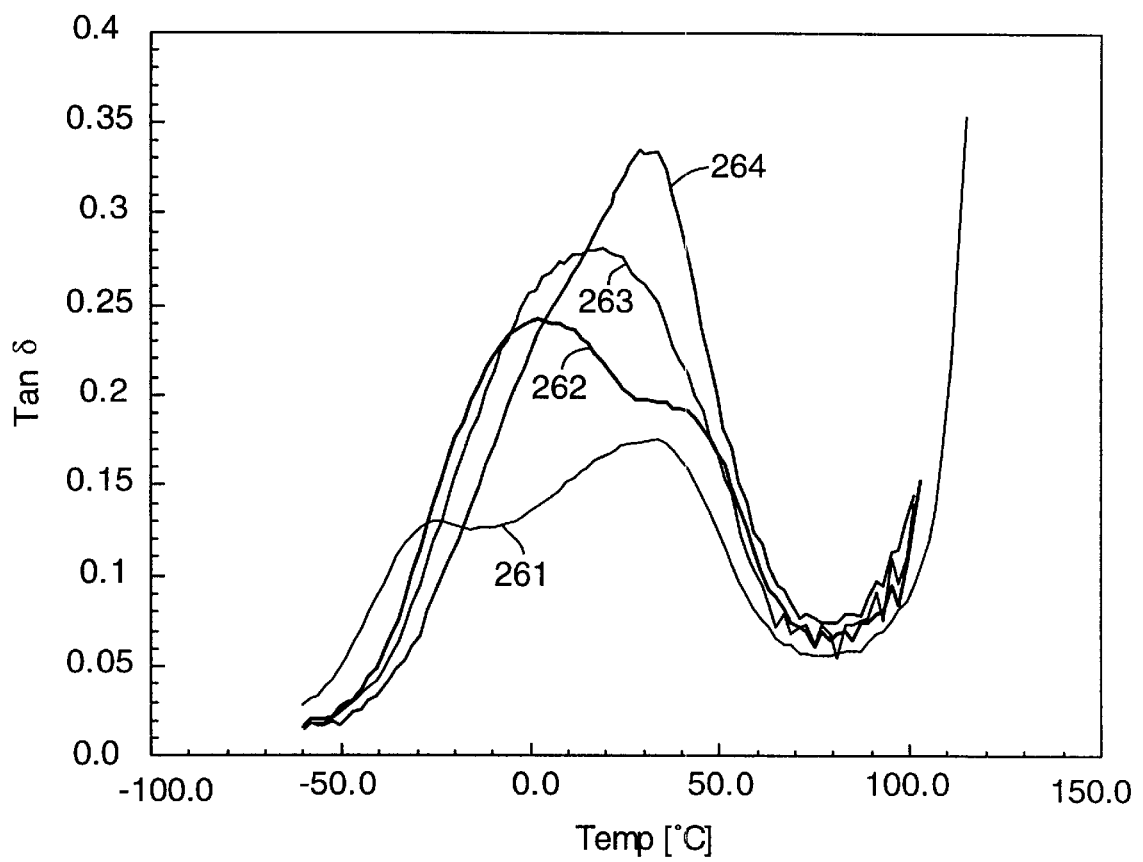
FIG. 24 is a graph illustrating Tan δ vs. temperature for various blends of polyolefin and hydrocarbon resin.

Using the method of Example 15, a polyolefin (ATTANE™ 4404, Dow Chemical Co.) and a hydrocarbon resin (REGALITE™ V3120, Hercules, Inc.) were mixed in selected proportions using a BRABENDER mixing head to formulate individual blends containing 0%, 20%, 25% or 30% hydrocarbon resin. Each blend was then pressed and quenched to form a clear homogenous film between 0.2 and 0.4 mm thick. Using the method of Example 1, the Tg of each of the films was evaluated. Curves 261, 262, 263, and 264 in FIG. 24 show the resulting dynamic mechanical analysis (DMA) curves illustrating Tan δ vs. temperature for 100% polyolefin (curve 261) and for blends containing 20%, 25% and 30% hydrocarbon resin (curves 262, 263 and 264, respectively). The pure polyolefin exhibited two Tan δ peaks, sugesting the existence of phase separation. As an increasing amount of the hydrocarbon resin was added to the polyolefin, the two tan delta peaks collapsed into a single symmetric peak, indicative of improved optical properties and reduced haze for the resulting film. Thus the hydrocarbon resin may act as a compatibilizer and inhibit phase separation.

Various modifications and alterations of this invention will be apparent to those skilled in the art without departing from the scope and spirit of this invention. This invention should not be restricted to that set forth herein for illustrative purposes only.

We claim:

1. A retroreflective article comprising a plurality of retroreflective elements and a film comprising a blend of polyolefin and hydrocarbon resin wherein the polyolefin is semicrystalline and has a suitable degree of crystallinity and molecular weight, or the polyolefin is amorphous and has sufficiently high molecular weight, and sufficient hydrocarbon resin is present in the blend, so that a 0.05 to 0.1 mm thick film made from the blend and aged at least 7 to 10 days resembles a plasticized polyvinyl chloride film sample of similar caliper when placed between a thumb and index finger and flexed or otherwise felt by hand at room temperature.

2. An article according to claim 1, wherein the retroreflective elements comprise transparent beads.

3. An article according to claim 1, wherein the retroreflective elements comprise microstructured prisms.

4. An article according to claim 1, wherein the film is also conformable, drapable or affinely deformable by hand.

5. An article according to claim 1, wherein the film is also conformable, drapable and affinely deformable by hand.

6. An article according to claim 1, wherein the film is oriented.

7. An article according to claim 1, wherein the film is substantially isotropic in two orthogonal directions in the plane of the film.

8. An article according to claim 1, wherein the film is clear and non-hazy.

9. An article according to claim 1, wherein the film comprises a multilayer film having a layer or layers comprising the blend and one or more additional layers.

10. An article according to claim 9, wherein at least one of the additional layers comprises an ink-receptive layer.

11. An article according to claim 9, wherein at least one of the additional layers comprises an adhesive.

12. An article according to claim 9, wherein at least one of the additional layers is scratch-resistant.

13. An article according to claim 1, wherein the article is sewable, launderable and weldable.

14. An article according to claim 1, wherein the article comprises reflective footwear, apparel, safety wear, a sweatband, or piping or an adornment for any of the foregoing.

15. An article according to claim 1, comprising at least about 5 wt. % hydrocarbon resin.

16. An article according to claim 1, wherein the blend comprises at least about 10 wt. % hydrocarbon resin.

17. An article according to claim 1, wherein the blend comprises at least about 20 wt. % hydrocarbon resin.

18. An article according to claim 1, wherein the blend comprises at least about 30 wt. % hydrocarbon resin.

19. An article according to claim 1, wherein the blend comprises about 40 to about 60 wt. % hydrocarbon resin.

20. A retroreflective article comprising a plurality of retroreflective elements and a multilayer film comprising:
   a) a core comprising a blend of polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that a 0.05 to 0.1 mm thick film made from the blend and aged at least 7 to 10 days resembles a plasticized polyvinyl chloride film sample of similar caliper when placed between a thumb and index finger and flexed or otherwise felt by hand at room temperature; and
   b) one or more additional layers of material different from the core.

21. An article according to claim 20, wherein the retroreflective elements comprise transparent beads.

22. An article according to claim 20, wherein the retroreflective elements comprise microstructured prisms.

23. An article according to claim 22, wherein one of the additional layers comprises a receptor layer adhered to a layer of the retroreflective elements.

24. An article according to claim 20, wherein one of the additional layers comprises a gloss layer.

25. An article according to claim 24, wherein the gloss layer is colored.

26. An article according to claim 20, wherein the core is colored.

27. An article according to claim 20, wherein the film is clear and non-hazy.

28. An article according to claim 20, wherein at least one of the additional layers is scratch-resistant.

29. An article according to claim 20, wherein the article is sewable, launderable and weldable.

30. An article according to claim 20, wherein the article comprises reflective footwear, apparel, safety wear, a sweatband, or piping or an adornment for any of the foregoing.

31. A method for making a retroreflective article comprising the steps of providing a retroreflective member having a plurality of retroreflective elements; extruding a film comprising a blend of polyolefin and hydrocarbon resin, wherein the polyolefin is semicrystalline and has a suitable degree of crystallinity and molecular weight, or the polyolefin is amorphous and has sufficiently high molecular weight and sufficient hydrocarbon resin is present in the blend, so that a 0.05 to 0.1 mm thick film made from the blend and aged at least 7 to 10 days resembles a plasticized polyvinyl chloride film sample of similar caliper when placed between a thumb and index finger and flexed or otherwise felt by and at room temperature; and attaching the film to the retroreflective member.

32. A method according to claim 31, wherein the retroreflective elements comprise transparent beads.

33. A method according to claim 31, wherein the retroreflective elements comprise microstructured prisms.

34. A method according to claim 31, comprising the further step of forming the retroreflective elements by embossing a thermoplastic film.

35. A method according to claim 31, further comprising surface-treating the film in order to enhance adhesion of a layer of retroreflective elements thereto.

36. A method according to claim 31, further comprising the step of forming one or more additional layers on the film.

37. A method according to claim 36, wherein at least one of the additional layers comprises a gloss layer.

38. A method according to claim 37, wherein the gloss layer is colored.

39. A method according to claim 36, wherein at least one of the additional layers is scratch-resistant.

40. A method according to claim 31, wherein the film is colored.

41. A method according to claim 31, wherein the film is clear and non-hazy.

42. A method according to claim 31, wherein the article is sewable, launderable and weldable.

43. A method according to claim 31, wherein the blend comprises at least about 5 wt. % hydrocarbon resin.

44. A method according to claim 31, wherein the blend comprises at least about 10 wt. % hydrocarbon resin.

45. A method according to claim 31, wherein the blend comprises at least about 20 wt. % hydrocarbon resin.

46. A method according to claim 31, wherein the blend comprises at least about 30 wt. % hydrocarbon resin.

47. A method according to claim 31, wherein the blend comprises about 40 to about 60 wt. % hydrocarbon resin.

48. A film comprising a blend comprising polyolefin and hydrocarbon resin, wherein the polyolefin is semicrystalline and has a suitable degree of crystallinity and molecular weight, or the polyolefin is amorphous and has sufficiently high molecular weight, and sufficient hydrocarbon resin is present in the blend, so that a 0.05 to 0.1 mm thick film made from the blend and aged at least 7 to 10 days is substantially non-elastomeric and resembles a plasticized polyvinyl chloride film sample of similar caliper when placed between a thumb, and index finger and flexed or otherwise felt by hand at room temperature; wherein the film comprises a multilayer film having a layer or layers comprising the blend and one or more additional layers; and wherein at least one of the additional layers comprises retroreflective elements.

49. A non-elastomeric film comprising a blend of hydrocarbon resin together with semicrystalline or amorphous polyolefin, or a mixture thereof, the blend being such that a 0.05 to 0.1 mm thick film made from the blend and aged at least 7 to 10 days resembles a plasticized polyvinyl chloride film sample of similar caliper when placed between a thumb and index finger and flexed or otherwise felt by hand at room temperature, the film further compressing a layer of retroreflective elements.

50. A method for making a film comprising blending, extruding and optionally orienting a mixture comprising polyolefin and hydrocarbon resin, wherein the polyolefin is semicrystalline and has a suitable degree of crystallinity and molecular weight, or the polyolefin is amorphous and has sufficiently high molecular weight, and wherein sufficient hydrocarbon resin is present in the mixture, so that a 0.05 to 0.1 mm thick film made from the mixture and aged at least 7 to 10 days is substantially non-elastomeric and resembles a plasticized polyvinyl chloride film sample of similar caliper when placed between a thumb and index finger and flexed or otherwise felt by hand at room temperature, and farther comprising sur treating the film in order to enhance adhesion of a layer of retroreflective elements thereto.

* * * * *

UNITED STATES PATENT AND TRADEMARK OFFICE
CERTIFICATE OF CORRECTION

PATENT NO. : 6,531,212 B2
DATED : March 11, 2003
INVENTOR(S) : Owusu, Osei A.

It is certified that error appears in the above-identified patent and that said Letters Patent is hereby corrected as shown below:

Title page,
Item [56], References Cited, U.S. PATENT DOCUMENTS, "Crignton" should read -- Crighton --; and "Szchecz" should read -- Szczech --.

Column 1,
Line 55, "a tactic" should read -- atactic --.

Column 6,
Lines 49 and 61, "thermoforning" should read -- thermoforming --.

Column 8,
Line 61, delete "of" following -- and --.

Column 9,
Line 45, "PICOTT" should read -- PICCO --.
Line 59, "R71005" should read -- R7100S --.

Column 10,
Line 65, "Dapability" should read -- Drapability --.

Column 11,
Line 22, "Efficiently" should read -- Sufficiently --.

Column 16,
Line 26, "homogenous" should read -- homogeneous --.
Line 55, "calendaring" should read -- calendering --.

Column 17,
Line 2, insert -- at -- preceding "a."

Column 18,
Line 2, "defornable" should read -- deformable --.

Column 23,
Line 13, "ATLASTM" should read -- ATLAS$^{TM}$ --.

Column 24,
Line 54, delete "a" following "is."

UNITED STATES PATENT AND TRADEMARK OFFICE
CERTIFICATE OF CORRECTION

PATENT NO.   : 6,531,212 B2
DATED        : March 11, 2003
INVENTOR(S)  : Owusu, Osei A.

It is certified that error appears in the above-identified patent and that said Letters Patent is hereby corrected as shown below:

Column 25,
Line 63, "3336" should read -- 3346 --.

Column 27,
Line 4, delete "were" following "temperatures."

Column 29,
Line 38, "rum" should read -- run --.
Line 53, "15-1through" should read -- 15-1 through --.
Line 30, "homogenous" should read -- homogeneous --.

Column 30,
Line 18, "homogenous" should read -- homogeneous --.
Line 26, "sugesting" should read -- suggesting --.
Line 40, insert -- , -- preceding "and."

Column 32,
Line 1, insert -- , -- preceding "and."
Line 6, "and" should read -- hand --.
Line 53, delete "," following "thumb."
Line 66, "compressing" should be -- comprising --.

Column 34,
Line 5, "farther" should be -- further --.
Line 5, "sur treating" should be -- surface-treating --.

Signed and Sealed this

Third Day of February, 2004

JON W. DUDAS
*Acting Director of the United States Patent and Trademark Office*